United States Patent
Iwase et al.

(10) Patent No.: US 8,823,637 B2
(45) Date of Patent: Sep. 2, 2014

(54) MOVEMENT AND TOUCH RECOGNITION FOR CONTROLLING USER-SPECIFIED OPERATIONS IN A DIGITAL IMAGE PROCESSING APPARATUS

(75) Inventors: Ayako Iwase, Kanagawa (JP); Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1179 days.

(21) Appl. No.: 12/582,046

(22) Filed: Oct. 20, 2009

(65) Prior Publication Data

US 2010/0149132 A1 Jun. 17, 2010

(30) Foreign Application Priority Data

Dec. 15, 2008 (JP) .................................. 2008-318001

(51) Int. Cl.

| | |
|---|---|
| G09G 5/00 | (2006.01) |
| G06F 3/033 | (2013.01) |
| G06K 9/62 | (2006.01) |
| G06F 3/038 | (2013.01) |
| G06F 1/16 | (2006.01) |
| G06F 3/0488 | (2013.01) |
| H04N 5/232 | (2006.01) |

(52) U.S. Cl.
CPC .............. *G06F 1/1694* (2013.01); *G06F 3/038* (2013.01); *G06F 2200/1637* (2013.01); *G06F 1/1643* (2013.01); *G06F 1/1626* (2013.01); *G06F 2203/04808* (2013.01); *G06F 2200/1636* (2013.01); *H04N 5/23216* (2013.01); *G06F 3/04883* (2013.01); *G06F 2203/0381* (2013.01)
USPC ............................. 345/156; 715/863; 382/224

(58) Field of Classification Search
USPC .......... 345/156, 158, 173, 175; 715/700–866; 382/118, 190–195, 224, 305; 707/723
See application file for complete search history.

(56) References Cited

U.S. PATENT DOCUMENTS

| | | | |
|---|---|---|---|
| 7,716,157 B1* | 5/2010 | Bourdev et al. ........................ 1/1 |
| 2005/0219223 A1* | 10/2005 | Kotzin et al. ................. 345/173 |
| 2006/0146765 A1* | 7/2006 | Van De Sluis et al. ....... 370/338 |
| 2006/0164382 A1* | 7/2006 | Kulas et al. ................... 345/156 |
| 2009/0060294 A1* | 3/2009 | Matsubara et al. ........... 382/118 |

(Continued)

FOREIGN PATENT DOCUMENTS

| | | |
|---|---|---|
| JP | 9-160716 A | 6/1997 |
| JP | 10-240434 A | 9/1998 |

(Continued)

OTHER PUBLICATIONS

Office Action issued Jul. 24, 2012, in Japanese Patent Application No. 2008-318001.

(Continued)

*Primary Examiner* — Rodney Amadiz
(74) *Attorney, Agent, or Firm* — Oblon, Spivak, McClelland, Maier & Neustadt, L.L.P.

(57) ABSTRACT

An image processing apparatus includes: a determining unit configured to determine one or more pieces of image data to be processed; a motion detecting unit configured to detect the motion of the image processing apparatus; a processing unit configured to execute predetermined processing regarding the one or more pieces of image data determined via the determining unit; and a processing control unit configured to execute control so as to execute the predetermined processing via the processing unit, in the case of detecting that a particular operation has been executed as to the image processing apparatus via the motion detecting unit.

19 Claims, 22 Drawing Sheets

(56) References Cited

U.S. PATENT DOCUMENTS

| | | |
|---|---|---|
| 2010/0083111 A1* | 4/2010 | de los Reyes ............... 715/702 |
| 2010/0201616 A1* | 8/2010 | Choi et al. ................... 345/156 |
| 2011/0193788 A1* | 8/2011 | King et al. ................... 345/173 |

FOREIGN PATENT DOCUMENTS

| | | |
|---|---|---|
| JP | 2004-343662 | 12/2004 |
| JP | 2005-142929 A | 6/2005 |
| JP | 2006-518507 A | 8/2006 |
| JP | 2007-274381 | 10/2007 |
| JP | 2008-176641 A | 7/2008 |

OTHER PUBLICATIONS

U.S. Appl. No. 12/580,627, filed Oct. 16, 2009, Ozawa, et al.

U.S. Appl. No. 12/604,795, filed Oct. 23, 2009, Iwase, et al.

U.S. Appl. No. 12/607,475, filed Oct. 28, 2009, Ozawa, et al.

* cited by examiner

FIG. 2

| FILE NAME | KEYWORD (MULTIPLE REGISTRATIONS ALLOWED) | GPS INFORMATION | |
|---|---|---|---|
| IMAGE ANALYSIS INFORMATION | CAMERA INFORMATION | | TAKEN DATE AND TIME |
| IMAGE DATA | | | |

FIG. 3

| FOLDER NAME | EVENT TITLE | CREATED DATE AND TIME | ETC. |
|---|---|---|---|
| | | | |
| FILE NAME 1 | ADDRESS ON RECORDING MEDIUM | TAKEN DATE AND TIME | |
| FILE NAME 2 | ADDRESS ON RECORDING MEDIUM | TAKEN DATE AND TIME | |
| ⋮ | ⋮ | ⋮ | |

FIG. 4

| CATEGORY | SEARCH KEY CANDIDATES |
|---|---|
| PEOPLE | FAMILY, FATHER, MOTHER, ELDER BROTHER, ELDER SISTER, YOUNGER BROTHER, YOUNGER SISTER,...<br>ALEX (HIMSELF/HERSELF), MR. A, MR. B, MR. C,... |
| PLACES | PLACE-NAME (STATE, CITY, COUNTY, TOWN, OTHER PLACE NAMES), STATION NAME, VARIOUS LANDMARK NAMES, ETC. |
| COLORS | RED, WHITE, BLACK, BLUE,... |
| SEASONS | SPRING, SUMMER, AUTUMN, WINTER, NEW YEAR, EARLY SPRING, EARLY SUMMER, SPRING RAINS, EARLY AUTUMN, EARLY WINTER,... |
| SUBJECTS | ANIMAL, DOG, CAT, LITTLE BIRD,...<br>FLOWER, DAFFODIL, SUNFLOWER,...<br>TREE, GRASS, MOUNTAIN, SEA, RIVER,... |
| CAMERA INFORMATION | DIAPHRAGM, SHUTTER SPEED,... |
| ETC. | IMAGE ANALYSIS, GPS INFORMATION |

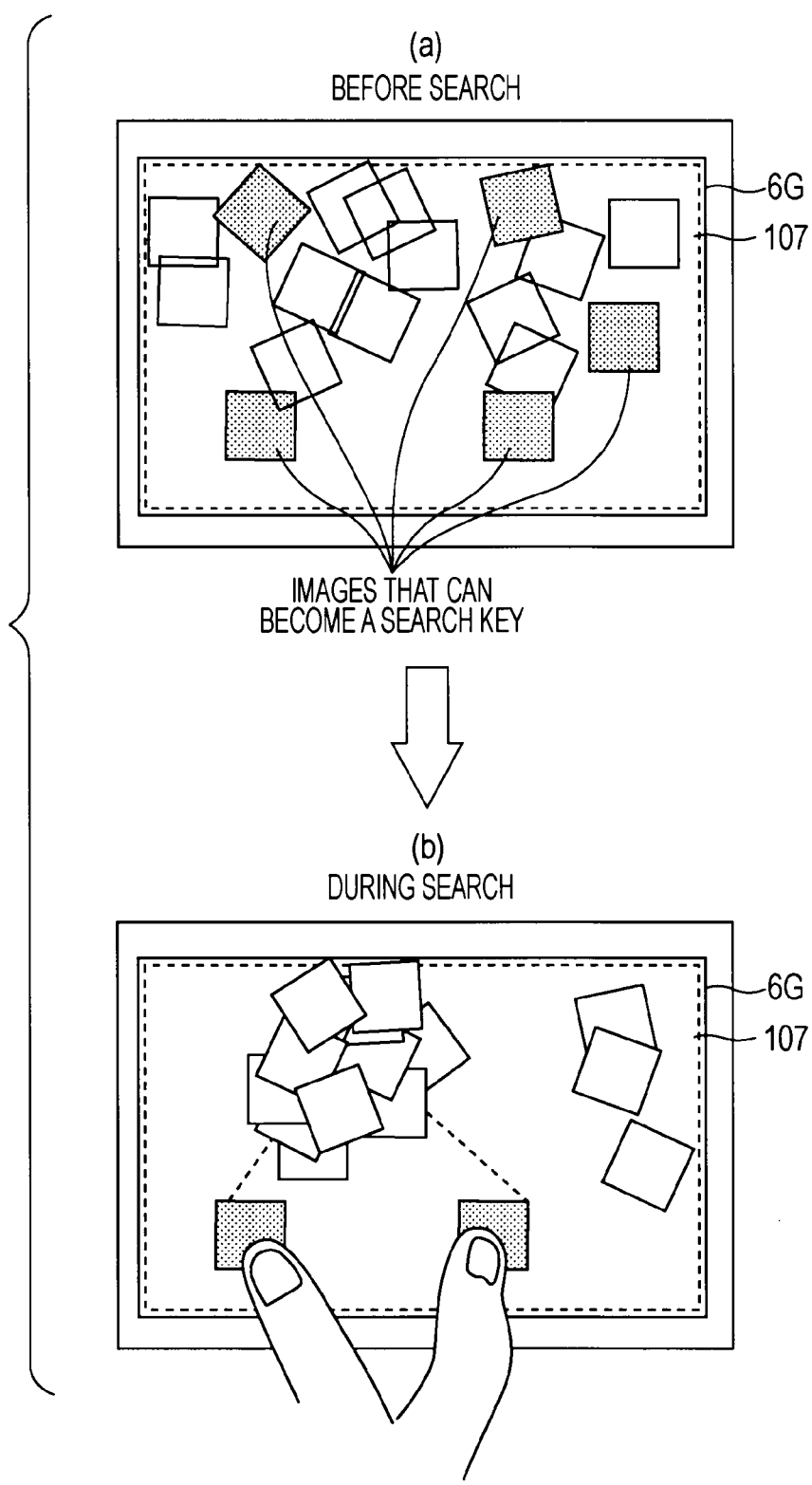

FIG. 12

| SEARCH KEY: SUMMER | |
|---|---|
| DEGREE OF ASSOCIATION | KEYWORD |
| HIGH | SUMMER, SUMMERTIME, EARLY SUMMER, SUMMER VACATION,... |
| MEDIUM | SUNFLOWER, WATERMELON, FIREWORKS SHOW, SEA,... |
| LOW | SPRING RAINS, HOMEWORK, SCHOOL, TRAVEL,... |

FIG. 13

| IMAGE ANALYSIS INFORMATION |
|---|
| AREA OF A PERSON'S FACE WITHIN AN IMAGE |
| NUMBER OF PERSONS WITHIN AN IMAGE |
| DEGREE OF A PERSON'S SMILING FACE WITHIN AN IMAGE |
| FEATURES (HUE, COMPLEXITY, ETC.) OF WHOLE IMAGE |
| ⋮ |

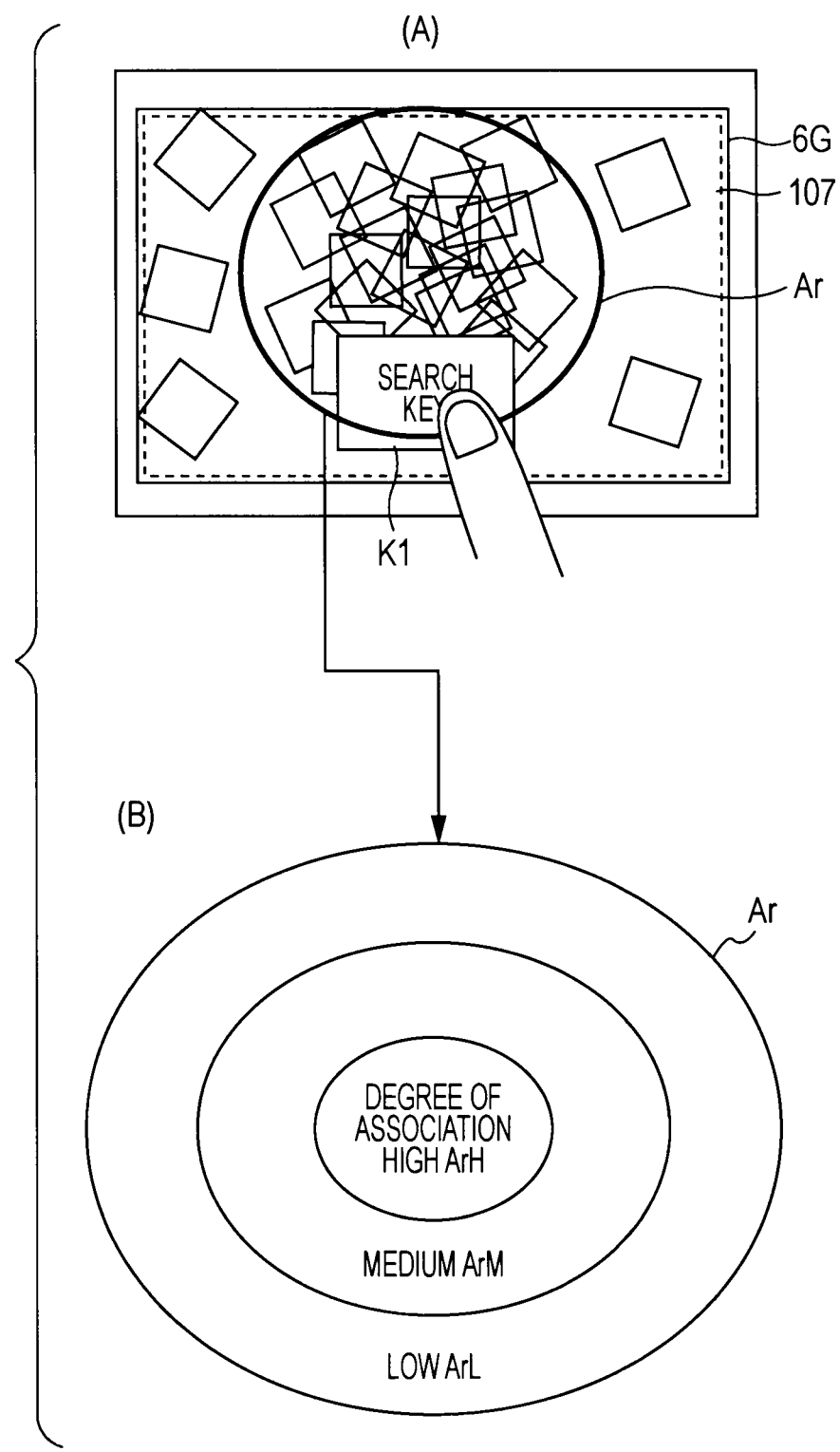

FIG. 15
(b) PREDETERMINED OPERATION
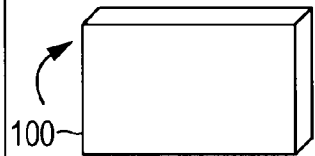
RAISE THE SET TO THE FRONT
100
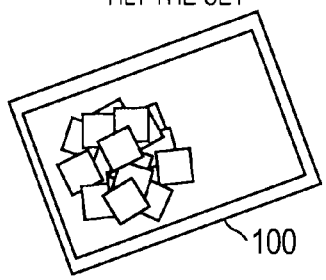
TILT THE SET
100
(a) IN A STATE WHEREIN IMAGE SEARCH HAS BEEN EXECUTED, AND RESULTS THEREOF ARE DISPLAYED
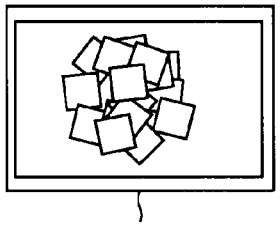
100
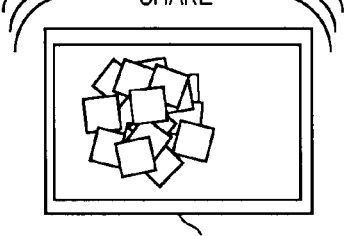
SHAKE
100
TAP
100
(c) IMAGE GROUP NARROWED DOWN IS SORTED AND STORED IN THE FOLDER
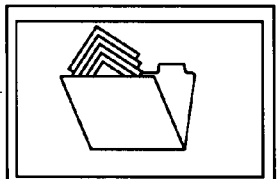
100

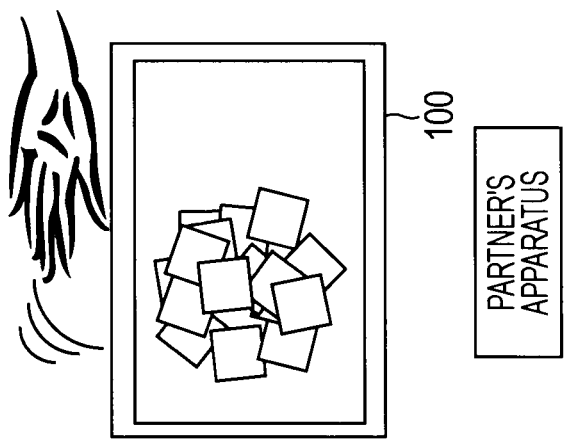
FIG. 19C TAP THE TOP OF THE SET
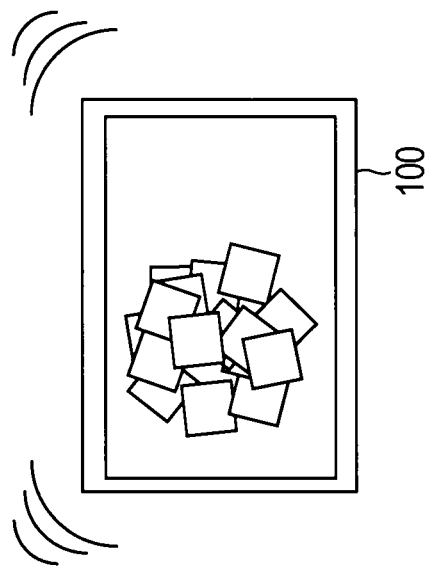
FIG. 19B SHAKE RIGHT AND LEFT
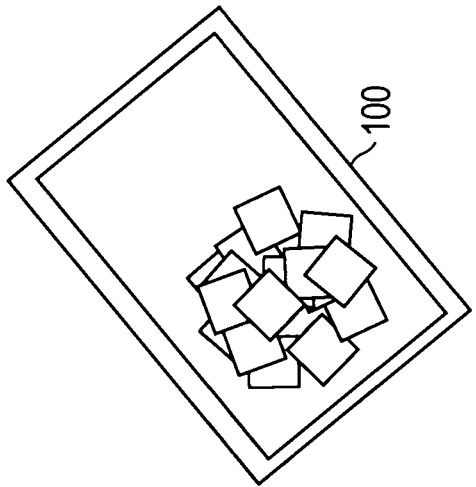
FIG. 19A TILT TO POUR

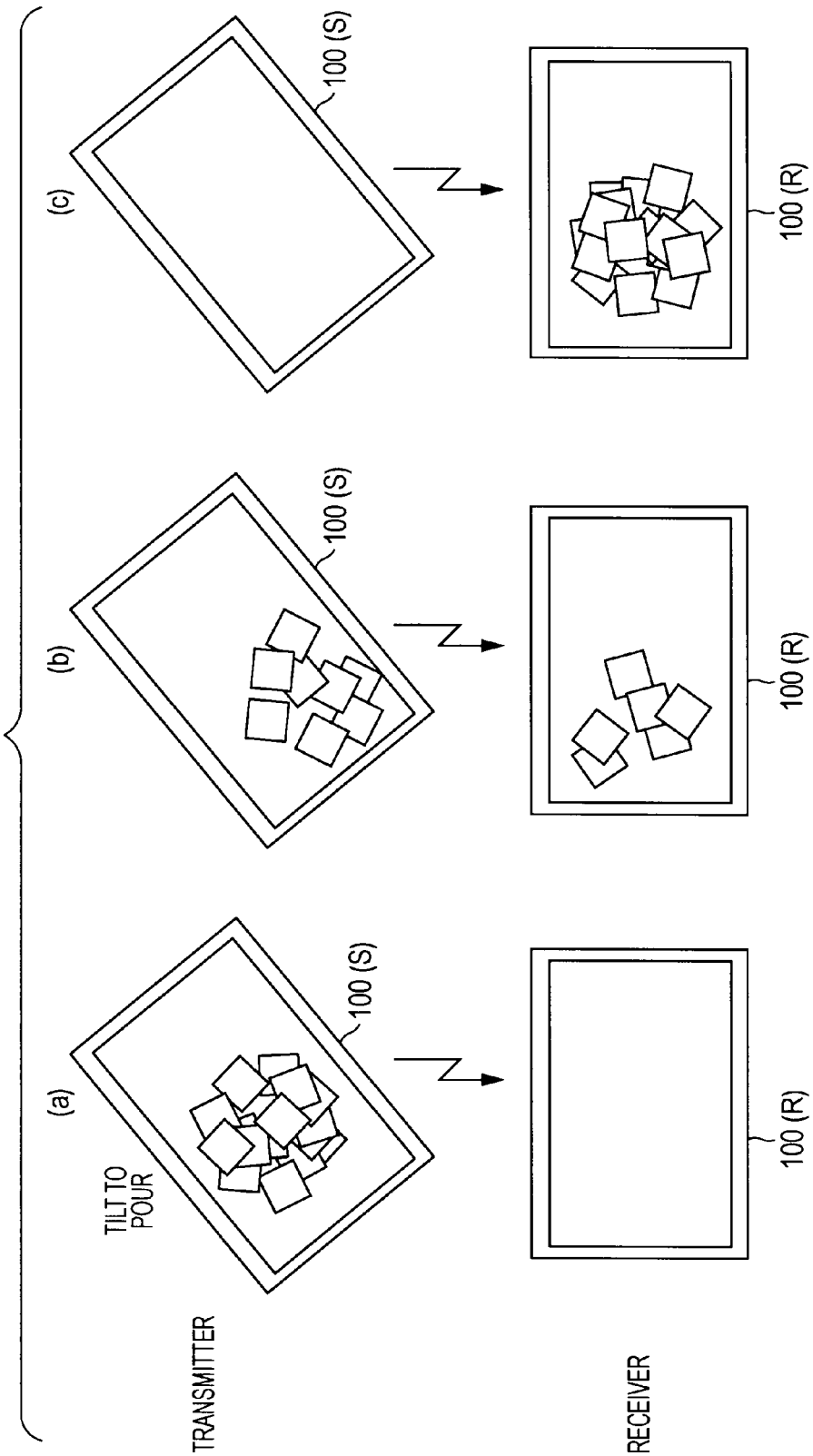

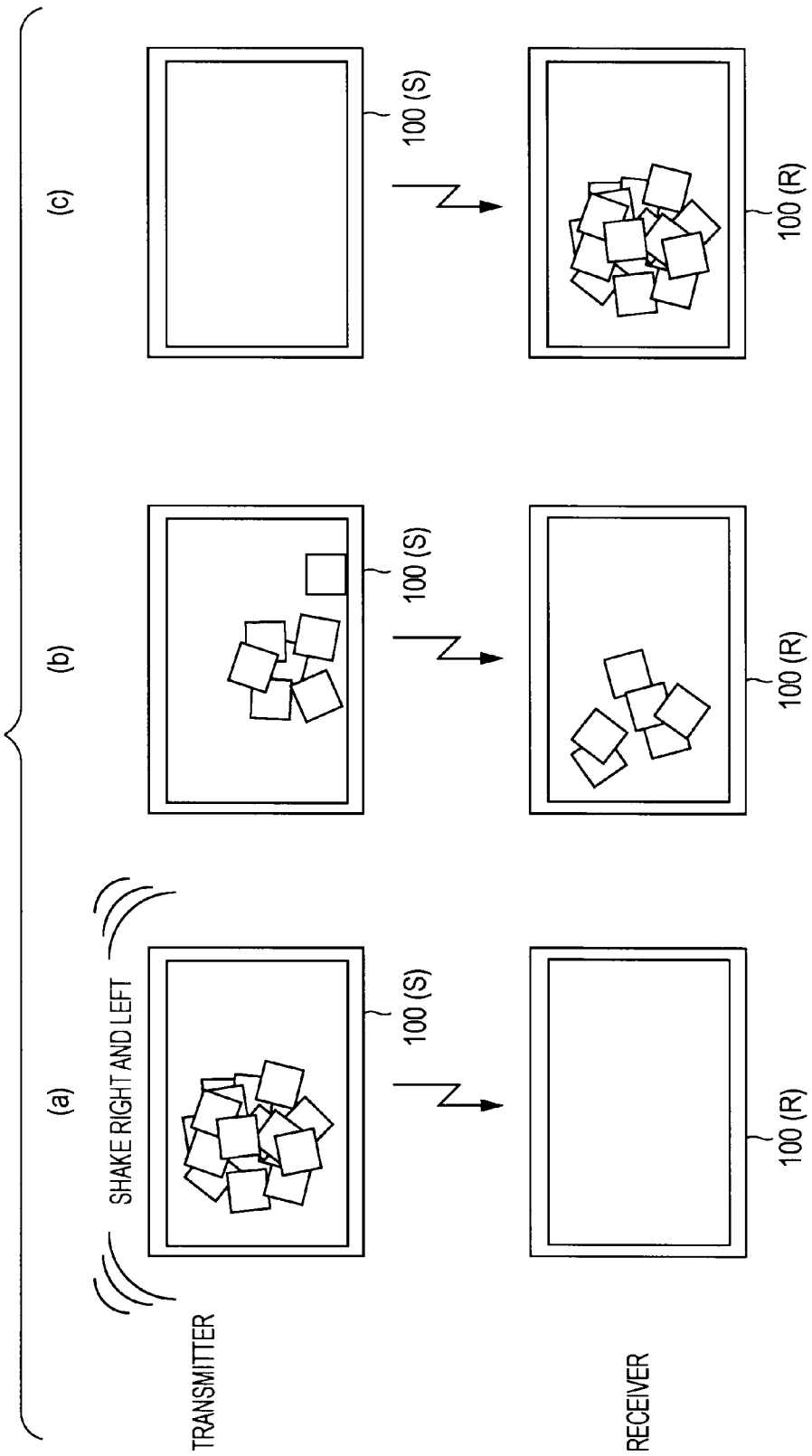

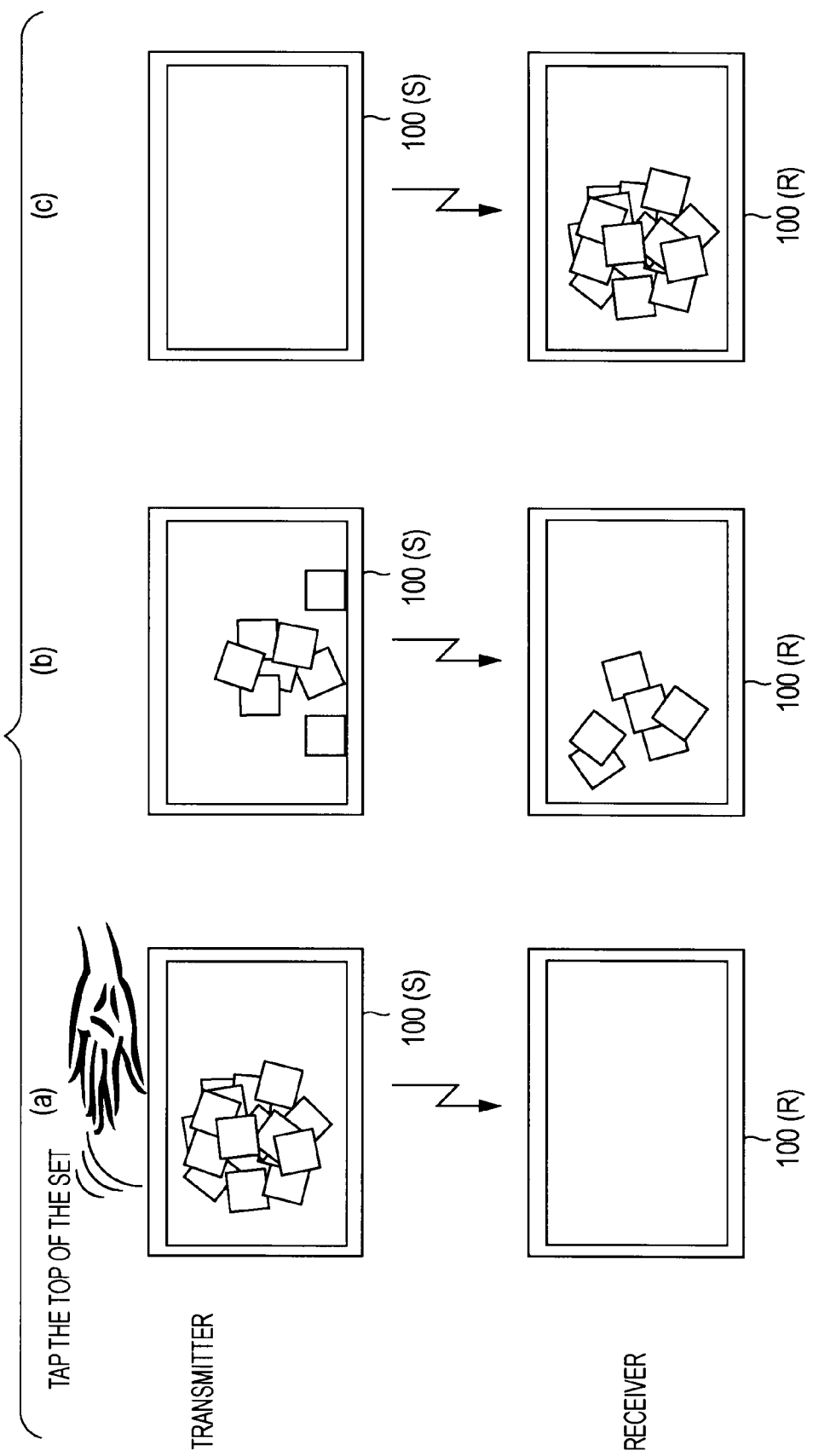

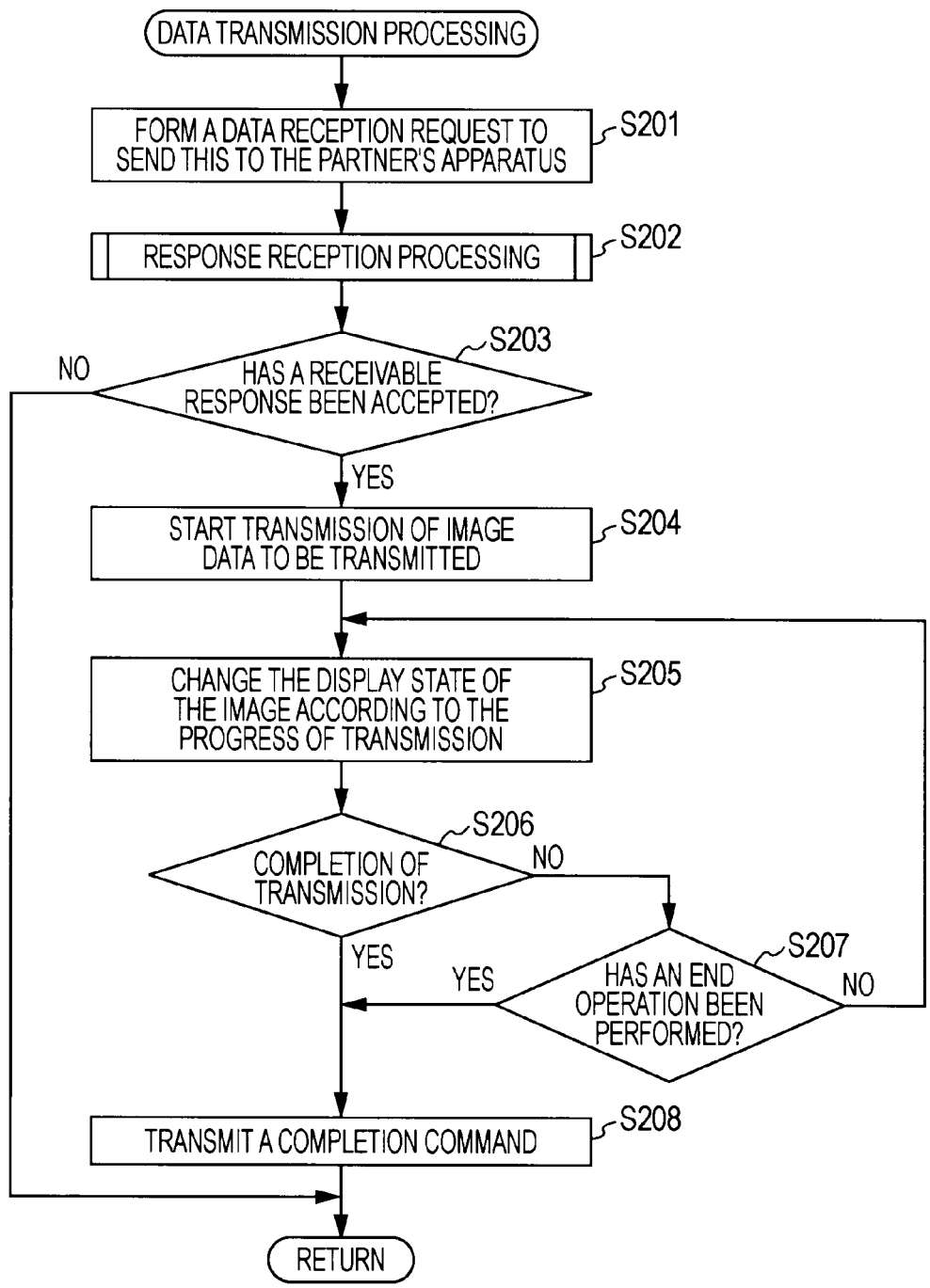

MOVEMENT AND TOUCH RECOGNITION FOR CONTROLLING USER-SPECIFIED OPERATIONS IN A DIGITAL IMAGE PROCESSING APPARATUS

BACKGROUND OF THE INVENTION

1. Field of the Invention

The present invention relates to an apparatus which processes image data, for example, such as a digital camera, a digital video camera, or the like, and a method and a program used with this apparatus.

2. Description of the Related Art

With electronic equipment which processes image data, such as a digital still camera, a digital video camera, or the like, operability for users has been improved with usage of various GUIs (Graphical User Interfaces) being enabled.

With electronic equipment to which a GUI has been applied, a user can be allowed to perform operations through a graphical element such as an icon or window displayed on a screen. Accordingly, even a user unaccustomed to the electronic equipment can suitably perform intended operations.

Also, various techniques for improving ease of use for electronic equipment by using a GUI have been disclosed in Japanese Unexamined Patent Application Publication No. 2007-274381 and Japanese Unexamined Patent Application Publication No. 2004-343662.

SUMMARY OF THE INVENTION

As described above, operability for a user can be improved by applying a GUI to electronic equipment. However, there are many cases wherein operations are requested in stages, such that upon an operation being performed as to one icon, further another operation is requested. In such a case, the number of times of operations increases, which sometimes leads to complexity of operations.

Therefore, with electronic equipment, there has been demand to allow a user to execute processing that has to be preformed frequently, processing that has to be performed rapidly, processing that has to be performed in a sure manner, or the like by operations as simple as possible.

Particularly, with image processing apparatuses such as digital still cameras, digital video cameras, and the like which are frequently carried and used, there has been demand to allow a user to perform target processing rapidly in a sure manner by simple operations.

It has been found to be desirable to allow a user to perform target processing rapidly in a sure manner by simple operations in the case of handling image data.

According to an embodiment of the present invention, an image processing apparatus includes: a determining unit configured to determine one or more pieces of image data to be processed; a motion detecting unit configured to detect the motion of the image processing apparatus; a processing unit configured to execute predetermined processing regarding the one or more pieces of image data determined via the determining unit; and a processing control unit configured to execute control so as to execute the predetermined processing via the processing unit, in the case of detecting that a particular operation has been executed as to the image processing apparatus via the motion detecting unit.

With the above configuration, one or more pieces of image data are determined by the determining unit. Upon detecting that a particular operation has been performed as to the image processing apparatus via the motion detecting unit, the processing unit is controlled by the processing control unit, whereby predetermined processing is executed by the determining unit regarding the one or more pieces of image data determined by the determining unit.

Thus, the user can execute target processing rapidly in a sure manner by simply performing a simple operation that can be detected by the motion detecting unit, for example, such as laying over, raising, tilting, shaking, or tapping this image processing apparatus.

According to the above configuration, an image processing apparatus which handles image data can allow a user to perform target processing rapidly in a sure manner with target image data as a processing target by simple operations.

BRIEF DESCRIPTION OF THE DRAWINGS

FIG. 2 is a diagram for describing a layout example of an image file to be recorded in a recording medium of the imaging apparatus;

FIG. 3 is a diagram for describing a layout example of an image folder formed in the recording medium of the imaging apparatus;

FIG. 4 is a diagram for describing a search key candidate information table formed in the recording medium of the imaging apparatus, or EEPROM, or the like beforehand;

FIG. 11 is a diagram for describing a case where image search is executed using an image as a search key;

FIG. 12 is a diagram for describing a configuration example of a search key degree-of-association dictionary;

FIG. 13 is a diagram for describing information that can become a search key for image search, of image analysis information;

FIG. 14 is a diagram for describing a display mode of search results in the case that image search is executed from a state in which one search key (character information) is selected;

FIG. 15 is a diagram for describing available operations serving as predetermined operations for determining the results of image search;

FIGS. 19A through 19C are diagrams for describing a case where an image file group obtained as a result of image search is transmitted to another imaging apparatus (another apparatus) configured in the same way;

FIG. 20 is a diagram for describing a case where an image file group obtained as a result of image search is transmitted to another imaging apparatus (another apparatus) configured in the same way;

FIG. 21 is a diagram for describing a case where an image file group obtained as a result of image search is transmitted to another imaging apparatus (another apparatus) configured in the same way;

FIG. 22 is a diagram for describing a case where an image file group obtained as a result of image search is transmitted to another imaging apparatus (another apparatus) configured in the same way;

FIG. 23 is a flowchart for describing data transmission processing to be executed at the imaging apparatus for transmitting an image file group obtained as a result of image search.

DESCRIPTION OF THE PREFERRED EMBODIMENTS

Description will be made below regarding an embodiment of an apparatus, method, or program of the present invention with reference to the drawings.

Configuration Example of Imaging Apparatus

Figure 1:
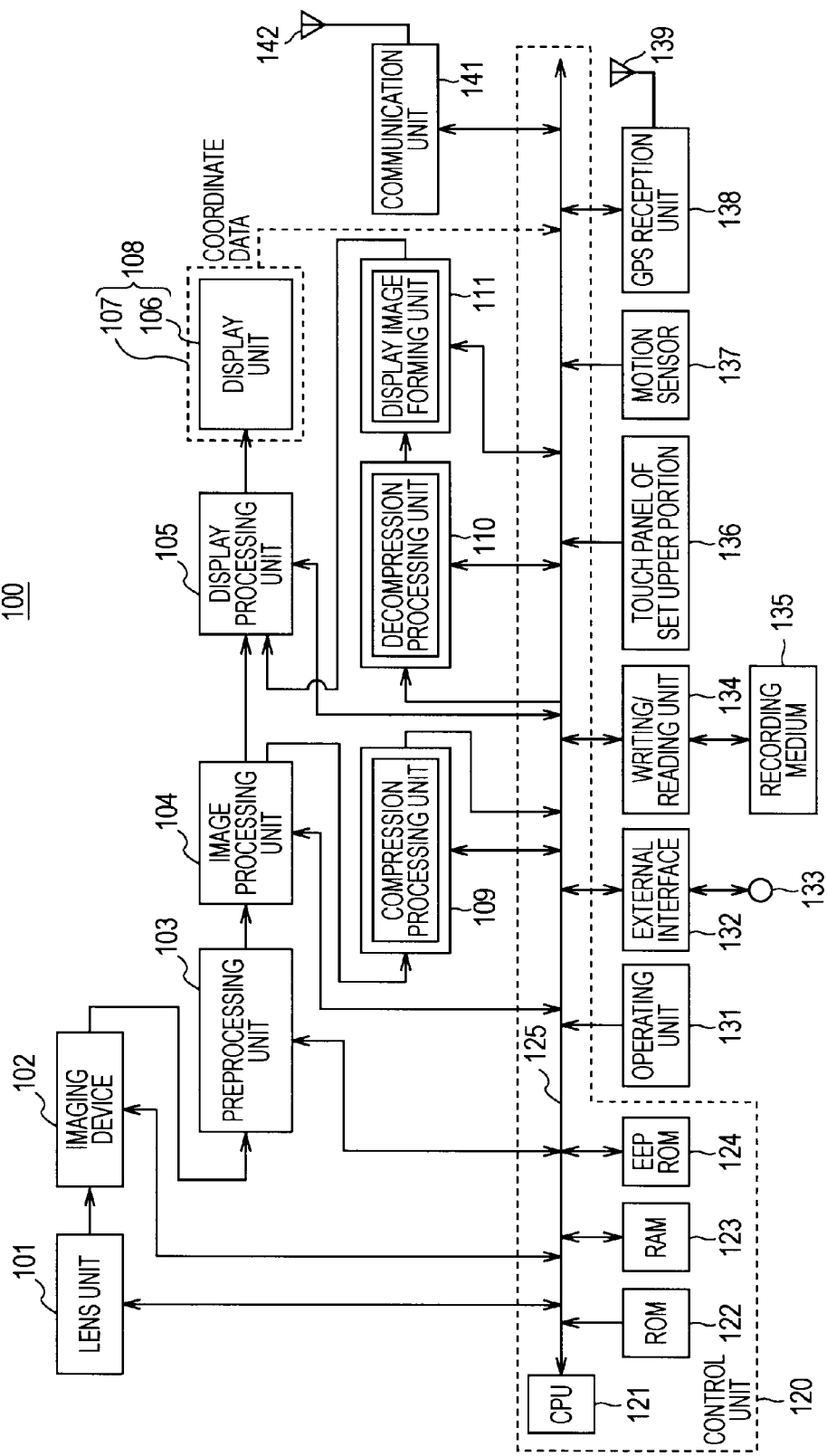
FIG. 1 is a block diagram for describing a configuration example of an imaging apparatus to which an embodiment of an apparatus, method, and program of the present invention has been applied.

FIG. 1 is a block diagram for describing a configuration example of an imaging apparatus 100 to which an embodiment of an apparatus, method, or program of the present invention has been applied. The imaging apparatus 100 can take both still images and moving pictures and record these in a recording medium, by switching a taking mode. However, with the embodiment described below, in order to simplify explanation, the configuration and operations of this imaging apparatus 100 will be described with a case where a function serving as a digital still camera is used for the imaging apparatus 100, and principally, still images are taken or played as an example.

As shown in FIG. 1, the imaging apparatus 100 includes a lens unit 101, an imaging device 102, a preprocessing unit 103, an image processing unit 104, a display processing unit 105, a display unit 106, a touch panel 107, a compression processing unit 109, a decompression processing unit 110, and a display image forming unit 111.

Also, the imaging apparatus 100 includes a control unit 120, an operating unit 131, an external interface 132, an input/output terminal 133, a writing/reading unit 134, and a recording medium 135. Also, the imaging apparatus 100 includes a touch panel on the set upper portion 136, a motion sensor 137, a GPS reception unit 138, a GPS reception antenna 139, a communication unit 141, and a transmission/reception antenna 142.

Note that, though not shown in FIG. 1, the imaging apparatus 100 according to the present embodiment also includes a clock circuit. This clock circuit has a calendar function, whereby the current date, current day of the week, and current time can be provided, and also a time counter function for measuring a predetermined time interval can be realized as appropriate.

According to the function of this clock circuit, information relating to taken date such as taken date and time, taken day of the week, or the like can be added to taken image data. Also, the function of the clock circuit is used, whereby a self timer shooting function that clicks the shutter automatically after elapse of a certain period of time since a predetermined operation to enable an image to be taken can also be realized.

With the imaging apparatus 100 according to the present embodiment, the display unit 106 is made up of a so-called thin display device, for example, such as an LCD (Liquid Crystal Display), organic EL panel (Organic Electroluminescence Panel), or the like. Though described later, the touch panel 107 is adhered to the whole surface of the display screen of the display unit 106 so as to form an operating surface.

The touch panel 107 accepts an specifying operation (contact operation) as to the operating surface from the user (operator), detects the specified position (touch position) on the operating surface of the touch panel 107, and notifies the control unit 120 of the coordinate data indicating the specified position thereof.

The control unit 120 controls each unit of the imaging apparatus 100 as described later, and also recognizes what kind of display is executed as to the display screen of the display unit 106. The control unit 120 can accept a specifying operation (input operation) from the user based on the coordinate data indicating the specified position on the operating surface from the touch panel 107, and display information on the display screen of the display unit 106 corresponding to the specified position thereof.

For example, let us say that the user brings a finger or stylus or the like into contact with a position of the operating surface of the touch panel 107. In this case, in the event that a number has been displayed on the position on the display screen corresponding (matching with) the contact position thereof, the control unit 120 can determine that the user has selected and input the displayed number thereof.

Thus, with the imaging apparatus 100, the display unit 106 and the touch panel 107 make up a touch screen 108 serving as an input apparatus. Note that the touch panel 107 is realized with, for example, a pressure-sensitive type or electrostatic type.

Also, the touch panel 107 can detect each of operations arranged to perform as to multiple portions on the operating surface simultaneously to output the coordinate data indicating each of the contact positions. Also, the touch panel 107 can also detect each of specifying operations arranged to be performed as to the operating surface repeatedly to output the coordinate data indicating each of the contact positions.

Further, the touch panel 107 can also detect contact positions continuously at predetermined timing to output the coordinate data indicating this while the finger or stylus is brought into contact by the user.

Thus, the touch panel 107 can accept various specifying operations (operation input) from the user such as a so-called tapping operation, double tapping operation, dragging operation, flicking operation, pinching operation, and the like to detect this.

Here, the tapping operation is a motion (operation) to specify on the operating surface only once by the user's finger or stylus, such as a "tap". The double tapping operation is a motion to specify on the operating surface continuously twice such as "tap, tap".

Also, the dragging operation is a motion to move the user's finger or stylus while contacting the operating surface. The flicking operation is a motion to specify one point on the operating surface with the user's finger or stylus, and then to operate so as to quickly flick this in an arbitrary direction.

The pinching operation is an operation to bring the user's two fingers into contact with the operating surface simultaneously to open or close the two fingers or the like. In this case, an operation to open the two fingers in contact or the like will be referred to as a pinch out operation, and an operation to close the two fingers or the like will be referred to a pinch in operation.

Though the dragging operation and the flicking operation differ in operation speed, the dragging operation and the flicking operation are operations to bring the user's finger or the like into contact with the operating surface and then to move this onto the operating surface (tracing operation on the operating surface), and are operations to be able to recognize with two types of information of movement distance and movement direction.

Therefore, with the present specification, in the case that one of the dragging operation and the flicking operation is performed, whereby the same processing can be performed, the term "tracing operation" is used as the general term of the dragging operation and the flicking operation.

Subsequently, the control unit 120 is connected to each unit making up the imaging apparatus 100, and controls each unit of the imaging apparatus 100 as described above, and has the configuration of a so-called microcomputer.

The control unit 120 is configured so as to connect to a CPU (Central Processing Unit) 121, ROM (Read Only Memory) 122, RAM (Random Access Memory) 123, and EEPROM (Electrically Erasable and Programmable ROM) 124 via a CPU bus 125.

The CPU 121 reads out a program stored in later-described ROM 122 to execute this, forms a control signal to be supplied to each unit to supply this to each unit, and accepts data or the like provided from each unit to process this.

The ROM 122 stores and holds, as described above, various programs to be executed by the CPU 121, various types of data for processing, and so forth beforehand. The RAM 123 is principally used as a work area, such as temporarily storing a result on the way with various types of processing.

The EEPROM 124 is so-called nonvolatile memory, and stores and holds information to be held even when the power of the imaging apparatus 100 is turned off. For example, various parameters set by the user, the final results of various types of processing, a processing program or data newly provided for adding a function or the like are held in the EEPROM 124.

The control unit 120 thus configured is, as shown in FIG. 1, connected to the operating unit 131, external interface 132, writing/reading unit 134, touch panel on the set upper portion 136, motion sensor 137, GPS reception unit 138, and communication unit 141.

The operating unit 131 includes operation keys such as various types of adjustment keys, function keys, shutter key, and the like, and accepts operation input from the user to notify the control unit 120 thereof. Thus, the control unit 120 controls each unit according to the operation input from the user accepted via the operating unit 131, whereby processing according the operation input can be executed.

The external interface 132 is a digital interface conforming to a predetermined standard, for example, such as USB (Universal Serial Bus), IEEE (Institute of Electrical and Electronics Engineers Inc) 1394, or the like.

That is to say, the external interface 132 accepts the data from external equipment connected to the input/output terminal 133 by converting this into data in a format that can be processed at the imaging apparatus 100, or outputs data output from the imaging apparatus 100 by converting this into data in a predetermined format.

The writing/reading unit 134 writes data to the recording medium 135 of the imaging apparatus 100, or reads out data recorded in the recording medium 135, according to the control of the control unit 120.

The recording medium 135 is configured so as to detachable to the imaging apparatus 100, and is so-called memory card type removable memory configured so as to have storage capacity of several gigabytes or more using semiconductor memory, for example.

Note that, an arrangement may be made wherein, for example, a built-in type recording medium such as built-in flash memory or small hard disk or the like may be used as the recording medium 135, besides memory card type removable memory.

Also, an arrangement may be made wherein another removable type recording medium such as an optical disc such as small DVD (digital Versatile Disc) or CD (Compact Disc) or the like may be used as the recording medium 135.

The touch panel on the set upper portion 136 is used for accepting specifying input from the user in a predetermined case. This touch panel 136 is also realized as a pressure-sensitive panel or electrostatic panel. Note that the touch panel on the set upper portion 136 is not necessarily configured of a touch panel, and rather may be realized as a so-called hardware key.

The motion sensor 137 is used for detecting the motion of the imaging apparatus 100, and specifically, is configured of a biaxial or triaxial acceleration sensor or the like. In the case that the imaging apparatus 100 is inclined, the motion sensor 137 can detect how much the imaging apparatus 100 is inclined in which direction to notify the control unit 120 thereof.

Also, the motion sensor 137 can detect distinctly a case where the imaging apparatus 100 is shaken horizontally, and a case where the imaging apparatus 100 is shaken vertically to notify the control unit 120 thereof. Also, for example, even in the case that vibration is applied to the imaging apparatus 100 by tapping, or the like, the motion sensor 137 can also detect this to notify the control unit 120 thereof.

The GPS reception unit 138 receives a predetermined signal from multiple satellites via the GPS reception antenna 139, and analyzes this, whereby the current position of the imaging apparatus 100 can be detected, and this can be notified to the control unit 120.

According to the function of the GPS reception unit 138, the imaging apparatus 100 obtains the current position information at the time of taking of an image, whereby the position information (GPS information) indicating the taking-of-image position can be added to image data as metadata. Note that the GPS reception unit 138 is configured so as to be operated or so as to stop the operation according to the instruction from the user accepted via the operating unit 131.

Also, the communication unit 141 realizes a short distance wireless communication function, for example, such as Bluetooth or the like via the transmission/reception antenna 142. The communication unit 141 is configured so as to transmit/receive data or a program of the like by communicating with electronic equipment having a similar communication unit via the transmission/reception antenna 142.

With the imaging apparatus 100 shown in FIG. 1, the lens unit 101 includes, though not shown in the drawing, an imaging lens (objective lens), exposure adjustment mechanism, focusing adjustment mechanism, shutter mechanism, and so forth, and is a portion to take an image of a subject, and to form an image on the sensor surface of the imaging device of the subsequent stage.

The imaging device 102 is configured of an imaging sensor (imaging device) such as a CCD (Charge Coupled Device) or CMOS (Complementary Metal Oxide Semiconductor) image sensor or the like. The imaging device 102 takes an image to be formed on the sensor surface of itself via the lens unit 101 as an electric signal (image signal).

With the imaging apparatus 100 according to the present embodiment, the imaging device 102 includes a single-plate color filter for a color pattern determined to form any one of signals of R (Red), G (Green), and B (Blue) for each pixel beforehand.

Subsequently, the image signal taken via the imaging device 102 is supplied to the preprocessing unit 103 of the subsequent stage. The preprocessing unit 103 includes a CDS (Correlated Double Sampling) circuit, an AGC (Automatic Gain Control) circuit, an A/D (Analog/Digital) converter, and so forth, and is a portion to take the image signal from the imaging device 102 as digital data.

The image signal (image data) taken via the preprocessing unit 103 is supplied to the image processing unit 104. The image processing unit 104 includes a detector circuit, a white balance circuit, a demosaic circuit, a resolution conversion circuit, another image correction circuit, and so forth, which are not shown in the drawings.

With the image processing unit 104, first, parameters for various types of adjustment processing, such as parameters for exposure adjustment, parameters for focusing (focal point) adjustment, parameters for white balance adjustment, and so forth are formed based on the image data from the preprocessing circuit 103.

Of the parameters formed at the image processing unit 104, parameters for exposure adjustment, and parameters for focusing adjustment are supplied to the control unit 120. The control unit 120 controls, based on the parameters from the image processing unit 104, the exposure adjustment mechanism and the focusing adjustment mechanism of the lens unit 101, whereby adjustment for exposure or focusing can be executed suitably.

Subsequently, with the image processing unit 104, black level matching processing, or white balance adjustment processing based on the parameters for white balance adjustment formed as described above is executed as to the image data from the preprocessing unit 103. According to such adjustment processing, the image data from the preprocessing unit 103 is adjusted so as to obtain an image having a suitable hue.

Subsequently, with the image processing unit 104, demosaic processing (simultaneous processing) for generating RGB data (three primary colors data), aperture correction processing, gamma (γ) correction processing, or the like is executed as to the image data adjusted so as to have a suitable hue.

Further, with the image processing unit 104, Y/C conversion processing for forming a luminance signal (Y) and color signals (Cb, Cr) from the formed RGB data, chromatic aberration correction processing, resolution conversion processing, or the like is executed to form a luminance signal Y and color signals Cb and Cr.

The image data (luminance signal Y, color signals Cb, Cr) formed at the image processing unit 104 is supplied to the display processing unit 105, and is converted into an image signal in a format to be supplied to the display unit 106, and is supplied to the display unit 106.

Thus, the image of a subject taken via the lens unit 101 is displayed on the display screen of the display unit 106, whereby the user can take an image of a target subject while confirming the image of the subject displayed on the display screen of the display unit 106.

Simultaneously, the luminance signal Y and the color signals Cb and Cr formed at the image processing unit 104 are also supplied to the compression processing unit 109. Subsequently, at timing when the shutter key of the operating unit 131 is pressed, the compression processing unit 109 subjects the image data of an image arranged to be displayed on the display screen of the display unit 106 to data compression at that time, and supplies this to the control unit 120.

Note that, with the compression processing unit 109, data compression processing is executed in accordance with a predetermined data compression method. As the data compression method, in the case of a still image, the JPEG (Joint Photographic Experts Group) method is used, and in the case of a moving picture, the MPEG (Moving picture Experts Group) method or the like is used. It goes without saying that the data compression method is not restricted to these, and rather various types can be used.

The control unit 120 controls the writing/reading unit 134 to record the image data subjected to data compression from the compression processing unit 109 in the recording medium 135. Thus, with the imaging apparatus 100, the image of a subject can be taken, and image data forming the image of the subject thereof can be recorded in the recording medium 135.

With the imaging apparatus 100, the image data thus taken and obtained can be stored in the recording medium 135 for each folder to be formed by the user, regarding which details will be described later, and can be managed.

Folders can be formed according to an object such as for each subject or for each event or the like. With the imaging apparatus 100 according to the present embodiment, folders are formed for each event where taking of an image has been executed, for example, such as the first day of school, athletic meet, birthday party, or the like. It goes without saying that taken image data can also be moved to a target folder later.

Subsequently, the image data recorded in the recording medium 135 is arranged to be able to be read out by the writing/reading unit 134 controlled by the control unit 120. The image data read out from the recording medium 135 is supplied to the decompression processing unit 110 via the control unit 120.

The decompression processing unit 110 subjects the image data supplied to itself to decompression processing in accordance with a data compression method used at the time of data compression to restore image data before data compression, and supplies this to the display image forming unit 111.

The display image forming unit 111 uses the image data from the decompression processing unit 110, also uses various types of display data supplied from the control unit 120 as appropriate to form the image data of an image to be displayed on the display screen of the display unit 106, and supplies this to the display processing unit 105.

The display processing unit 105 converts the image data from the display image forming unit 111 into an image signal in a format to be supplied to the display unit 106, and supplies this to the display unit 106, in the same way as when the image data from the image processing unit 104 was processed.

Thus, the image corresponding to the image data recorded in the recording medium 135 can be displayed on the display screen of the display unit 106. That is to say, the image data of a target image recorded in the recording medium 135 can be played.

Thus, the imaging apparatus 100 according to the present embodiment can take the image of a subject and record in the recording medium 135. Also, the imaging apparatus 100 reads out image data recorded in the recording medium 135 to subject this to playback processing, whereby the image corresponding to the image data thereof can be displayed on the display screen of the display unit 106.

With the imaging apparatus 100 having the above configuration, as described below, information serving as a search key (search condition) candidate such a keyword or the like is added to an image file recorded in the recording medium 135 by being taken, and image data can be searched accordingly.

With the imaging apparatus 100, even in the case that search processing for image data has to be performed repeatedly multiple times, the search is arranged so as to be performed with a few operating steps as less as possible. Further, with the imaging apparatus 100, search results can be provided to the user in an easily understood manner, or can be determined with simple operations.

Configuration Examples of Image File and Image Folder

FIG. 2 is a diagram for describing a layout example of an image file to be recorded in the recording medium 135 of the imaging apparatus 100. As shown in FIG. 2, image files have a file name that is identification information for identifying each image file. This file name is automatically provided by the control unit 120 at the time of taking of an image.

Also, metadata such as a keyword, GPS information, image analysis information, camera information, taken date and time, and so forth is arranged to be added to each image file. Such metadata can be used as the information corresponding to the search key of image data.

Here, the keyword is principally text data to be input by the user. Specifically, with regard to the keyword, a plurality of information can be registered as keywords, which indicates a place name indicating a place where an image has been taken, the name of a person who has been taken into an image, the name of an event that has been held at a place where an image has been taken, the content of the image thereof, and so forth.

Note that the keyword is input via the operating unit 131 and the touch screen 108 in the case that the image corresponding to the image data of an image file to which the keyword will be added is displayed on the display screen of the display unit 106, whereby the keyword can be added to this image file.

Also, for example, an arrangement may be made wherein on a personal computer various types of metadata such as a keyword or the like is added to image data, this is taken into the imaging apparatus 100 via the input/output terminal 133 and the external interface 132, and is recorded in the recording medium 135. That is to say, image data to which metadata such as a keyword and the like has been added at external equipment is taken into the imaging apparatus 100, whereby this can be used.

The GPS information is position information (information of longitude and latitude) indicating the position at the time of taking an image obtained via the above GPS reception unit 138, which can be added to an image file via the control unit 120.

The image analysis information is arranged so as to subject the image data of this image file to image analysis by a predetermined method, thereby obtaining image analysis results, and storing these in each image file. This image analysis is executed principally with the function of the control unit 120 at appropriate timing after taking of an image, and image analysis results thereof are added to the image file.

With the image analysis information, for example, various techniques such as edge detection, color analysis, and the like are used, whereby the features of the image according to each image data can be indicated by being digitized, and the similarities of picture compositions and subjects can be compared between images.

For that matter, according to this image analysis information, based on the results of this image analysis, an image where a similar person (face) has been taken can be searched, an image where a similar place has been taken can be searched, or an image where features such as hue and complexity are similar can be searched.

Also, this image analysis information is, though described later, information obtained as a result of image analysis, and includes various types of analysis information, such as the area of a person's face within an image, the number of persons who have been taken into an image, the degree of a person's smiling face who has been taken into an image, and information indicating the features of the whole image.

The camera information is information indicating diaphragm, shutter speed, and so forth at the time of taking of an image. This camera information is information managed at the control unit 120, and is added to an image file by the control unit 120 in the case that taking of an image has been performed. According to this camera information, it can be recognized that image data has been taken under what kind of camera conditions.

The taken date and time is date and time information that the control unit 120 has obtained at the time of taking of an image via the clock circuit not shown, and has been added to an image file, and is made up of date and time. Thus, it can be recognized accurately when the image data of each image file was taken. Image data forming the image of a subject obtained by taking an image is stored in an image file as main data. The image file thus formed is recorded in the recording medium 135 of the imaging apparatus 100. Subsequently, the image file is, as described below, stored in an image folder to be created in the recording medium 135 in accordance with the user's instructions.

Note that, with the imaging apparatus 100 according to the present embodiment, in the case that the user does not form an image folder, for example, the folder corresponding to taken date is automatically formed, whereby image data obtained by taking an image can be stored in this.

The image folders in which an image file is stored, as described above, are formed for each event where taking of an image has been performed, for example, such as the first day of school, athletic meet, birthday party, or the like, or for each taken year and month, or for each taken year, month, and day, or the like.

In addition to this, for example, in the case that image folders are formed for each subject and used, or in the case that the imaging apparatus 100 is shared by a family or the like, the image folders are formed for each photographer, and can be used accordingly.

FIG. 3 is a diagram for describing a layout example of an image folder to be formed in the recording medium 135 of the imaging apparatus 100. As shown in FIG. 3, an image folder has a folder name that is identification information for identifying each folder. This folder name is, for example, information corresponding to an event where taking of an image has been performed, such as the first day of school, athletic meet, birthday party, or the like, information relating to a taken day, such as taken year and month, taken year, month, and day, or the like. Also, each image folder has the event title of this image folder, created date and time, other various types of metadata.

The event title can store, in the case that the image folder thereof has been created corresponding to an event, information indicating the more detailed content of the event, e.g., detailed content such as "Alex's first day of school 2008.4.10".

The created date and time is information indicating date and time when this image file was created, and is information that the control unit 120 obtains from the clock circuit not shown at the time of creating an image folder.

In addition to this, information that can be added automatically at the imaging apparatus 100, such as the number of image files stored in this image folder, or comment information (character information) to be input by the user, or the like, can be added as the metadata.

An image folder stores the file name, address on the recording medium, taken date and time, of each of image files belonging to the folder thereof. According to the information of this image folder, it can be recognized when images were taken, which image files are stored in this image folder, and where the image files thereof are stored on the recording medium.

Subsequently, with image files, the image file of image data obtained by taking an image is managed in time-series order according to taken date and time. Thus, based on the information of the image folder, the image data of the image files shown in FIG. 3 can be read out in the direction of time elapsing to display this sequentially, or can be read out sequentially in a direction back in time to display this.

Search Key Candidate Information Table

With the imaging apparatus 100 according to the present embodiment, in order to enable image data search processing using a search key to be performed readily, information serving as a candidate of a search key (search key candidate information) is registered beforehand. The search key candidate information registered in this search key candidate information table can be used as a search key without being registered at the time of search, which will be described later as well.

FIG. 4 is a diagram for describing the search key candidate information table to be created in the recording medium 135 or the EEPROM 124 or the like of the imaging apparatus 100 beforehand. With the imaging apparatus 100 according to the present embodiment, the search key candidate information table manages search key candidate information by classifying into seven categories of "people", "places", "colors", "seasons", "subjects", "camera information", and "etc.".

The search key candidate information relating to people belongs to the category "people", and information such as "family, father, mother, elder brother, elder sister, younger brother, younger sister, . . . " and so forth is registered beforehand, as shown in FIG. 4. Also, the name of the user himself/herself, the name of a friend or acquaintance who will be (has been) a subject, or the like can be registered by the user himself/herself, for example, such as "Alex (himself/herself) ", "Mr. A", "Mr. B", "Mr. C", or the like.

The search key candidate information relating to places belongs to the category "places", and information such as a state, city, county, town other place names, station name, various landmark names, and so forth is registered beforehand, as shown in FIG. 4. Note that the user himself/herself can register a newly created place name, the name of a newly created landmark (skyscraper or commercial facilities, or the like), a place name that has not been registered, or the like.

Color names such as red, white, black, blue, and so forth, as shown in FIG. 4, belong to the category "colors", multiple color names that have frequently commonly been used are registered beforehand. Note that the user himself/herself can also register color names that are not registered beforehand.

The search key candidate information relating to seasons belongs to the category "seasons", and some words relating to seasons such as new spring, early spring, early summer, early autumn, early winter, and so forth other than "spring, summer, autumn, winter" are registered beforehand, as shown in FIG. 4. Note that the user himself/herself can also register words relating to seasons that are not registered beforehand.

The search key candidate information relating to what can serve as a subject is registered in the category "subjects", and the name of what can commonly frequently serve as a subject, such as an animal, flower, tree, mountain, sea, and so forth are registered beforehand, as shown in FIG. 4. Note that the user himself/herself can also register a word relating to what can serve as a subject that is not registered beforehand.

The search key candidate information such as camera setting conditions at the time of taking of an image such as diaphragm, shutter speed, and the like is registered in the category "camera information" beforehand. For example, this is used in the case that an image taken using a particular setting condition is searched, or the like. Note that the user himself/herself can also register camera information that is not registered beforehand.

The search key candidate information not belonging to any of the above six categories is registered in the category "etc.". For example, item names such as image analysis, GPS information, and the like are registered, and these are selected, whereby the image analysis information of a particular image can be used as a search key, and the GPS information of a particular image can be used as a search key.

With the imaging apparatus 100 according to the present embodiment, as also described above, the user can add various keywords to an image file recorded in the recording medium 135 by taking an image.

As also described above, the user plays the image according to the image data stored in the image file recorded in the recording medium 135 by taking an image, and upon performing predetermined operations for adding a keyword, the keyword can be input via the operating unit 131.

In this case, a search key candidate information list of the search key candidate information table shown in FIG. 4 is displayed, whereby a target keyword can be selected and added from the displayed candidates.

Also, in the case that there is no target keyword of the search key candidate information list, for example, text data such as a word is input via an input key realized with the touch screen 8, whereby this can be added as a keyword.

As also described above, it goes without saying that an arrangement may be made wherein on the personal computer, various types of metadata such as a keyword and the like is added to image data, this is taken into the imaging apparatus 100 via the input/output terminal 133 and the external interface 132, and is recorded in the recording medium 135. That is to say, image data to which metadata such as a keyword and the like were added at external equipment is taken into the imaging apparatus 100, whereby this can be used.

Also, a search key candidate can also be added to the search key candidate table of the imaging apparatus 100 via external equipment such as a personal computer to be connected via the input/output terminal 133 and the external interface 132.

It goes without saying that the search key candidate table formed at external equipment such as a personal computer or the like is taken into via the input/output terminal 133 and the external interface 132, and this is stored in predetermined memory such as the EEPROM 124 or the like, whereby this can be used.

In this case, in the event that there is no information input as a keyword in the search key candidate information table, the control unit 120 requests confirmation regarding whether or not this key word is registered additionally in the search key candidate information table.

Subsequently, in the case that additional registration has been instructed, the control unit 120 can register this keyword in the category instructed by the user via the operating unit 131 or the like, for example.

Thus, with the imaging apparatus 100 according to the present embodiment, one of the keywords added to the image files stored in the recording medium 135, and one of the search key candidate information registered in the search key candidate information table are arranged to be matched.

Selection Processing of Search Key Used for Image Search

Next, description will be made regarding processing for selecting a search key used for image search from the search key candidate information registered in the search key candidate information table shown in FIG. 4, with the imaging apparatus 100 according to the present embodiment. FIGS. 5A through 7B are diagrams for describing processing for selecting a search key used for image search from the search key candidate information registered in the search key candidate information table.

With the imaging apparatus 100, for example, a predetermined operation is performed, for example, such as a pressing operation of a menu key provided to the operating unit 131, or the like, whereby the control unit 120 forms a menu having processes that can be executed at the imaging apparatus 100 as selection items, and displays this on the display unit 106.

That is to say, the control unit 120 uses information for display, or the like stored in the ROM 122 to form image data for menu display (menu screen). Subsequently, the control unit 120 processes the formed image data for menu display via the decompression processing unit 110, display image forming unit 111, and display processing unit 105 to form an image signal for menu display, and supplies this to the display unit 106.

Thus, a menu screen with processes that are executable at the imaging apparatus 100 as selection items is displayed on the display screen 6G of the display unit 106. Note that, with regard to the image data for menu display, decompression processing does not have to be executed, and accordingly, the image data for menu display is not subjected to particular processing at the decompression processing unit 110.

With the imaging apparatus 100, as described with reference to FIG. 1, the touch screen 108 is made up of the display unit 106 and the touch panel 107, instruction input from the user is accepted via this touch screen 108.

The user performs an operation to select a menu item "image search" from the menu displayed on the display screen 6G of the display unit 106 as to the imaging apparatus 100. Specifically, the user brings the finger or the like in contact as to a position on the operating surface of the touch panel 107 corresponding to the display position of the menu item "image search".

Thus, the coordinate data indicating the contact position of the user on the operating surface is supplied to the control unit 120 from the touch panel 107. The control unit 120 determines which item has been selected by the user based on this coordinate data, and the display information displayed on the position on the display screen corresponding to the position on the operating surface indicated with this coordinate data.

In this case, the control unit 120 recognizes that the menu item "image search" is displayed on the position of the display screen 6G corresponding to the position on the operating surface brought into contact by the user. Accordingly, the control unit 120 can determine that the menu item "image search" has been selected by the user.

Figure 5A:
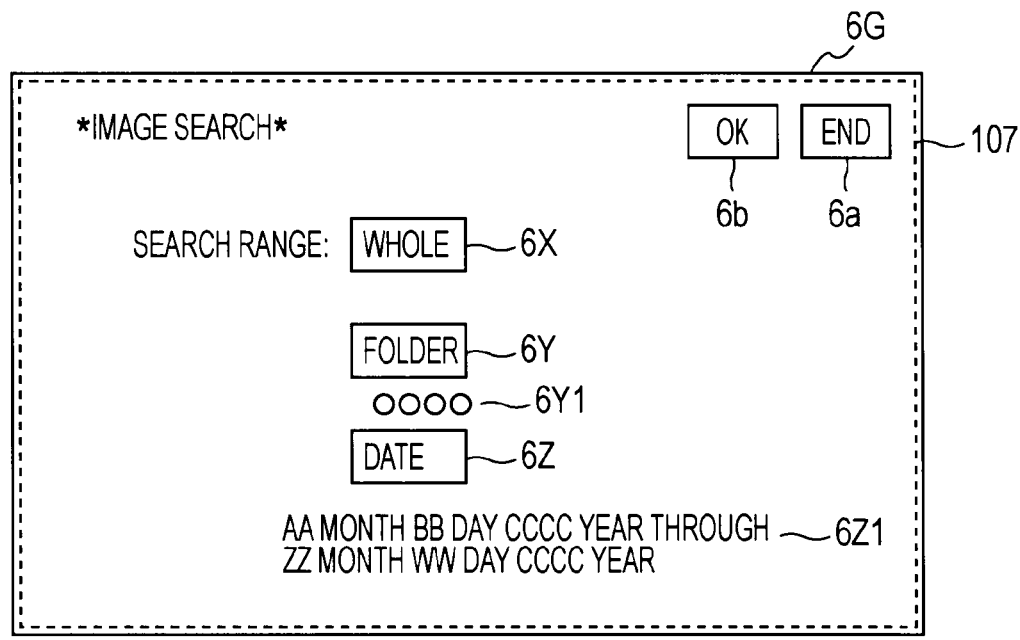
FIGS. 5A and 5B are diagrams for describing processing for selecting a search key used for image search from search key candidate information registered in the search key candidate information table.

Subsequently, the control unit 120 displays a search range setting screen shown in FIG. 5A on the display screen 6G of the display unit 106, in the same way as with the case of displaying the above menu. As shown in FIG. 5A, the search range setting screen has a title (screen title) called "* image search *", and also has a whole icon 6X, folder icon 6Y, and date icon 6Z for specifying a search range. Also, the search range setting screen has, as shown in FIG. 5A, an end icon 6a, and an OK icon 6b on the right upper edge portion.

In FIG. 5A, the whole icon 6X is for specifying all the image files recorded in the recording medium 135 as a search target. Accordingly, in the case that the whole icon 6X has been selected, the control unit 120 sets all the image files recorded in the recording medium as search targets at the time of the image search.

The folder icon 6Y is for specifying only image files stored in the image folder selected by the user of the image files recorded in the recording medium 135 as search targets.

In the case that the folder icon 6Y has been selected, the control unit 120 forms a list of the image folders formed in the recording medium 135, and displays this on the display screen of the display unit 106, whereby the user can select a target image folder.

In the case that an image folder has been selected by the user, in FIG. 5A, as shown in display 6Y1, the control unit 120 displays the folder name of the selected image folder on the display screen 6G of the display unit 106.

Subsequently, the control unit 120 sets only the image files stored in the selected image folder as a search target. Note that the image folder that can be selected is not restricted to one, and rather multiple image folders can also be set as search targets.

The date icon 6Z is for specifying, of the image files recorded in the recording medium 135, only the image files wherein the appended taken year, month, and day belong to the date range specified by the user, as search targets.

In the case that the date icon 6Z has been selected, the control unit 120 displays a date range setting screen on the display screen of the display unit 106, whereby the user can input a target date range.

In the case that a date range has been input, in FIG. 5A, as shown in display 6Z1, the control unit 120 displays the input date range on the display screen 6G of the display unit 106. Subsequently, the control unit 120 sets only the image files of which the taken year, month, and day belong to the input date range, as search targets.

Note that the date range may be one day such as October 1, year 2008 through October 1, year 2008, and input (setting) of a range, such as several days, several weeks increments, several months, or several years, may be performed.

Subsequently, with the search range setting screen shown in FIG. 5A, in the case that the end icon 6a has been selected, the control unit 120 ends the image search processing, and for example, returns to a state in which the menu screen is displayed.

Also, with the search range setting screen shown in FIG. 5A, in the case that the OK icon 6b has been selected, the control unit 120 executes the image search with the selected range. In this case, the control unit 120 forms, as shown in FIG. 5B, a search key selection screen (1) having a category list display 611, and displays this on the display screen 6G of the display unit 106.

Note that, in the case that the OK icon 6b has been selected in spite of no search range being selected, the control unit 120 sends a warning sound, or displays a warning message, thereby prompting the use to select a search range.

Figure 5B:
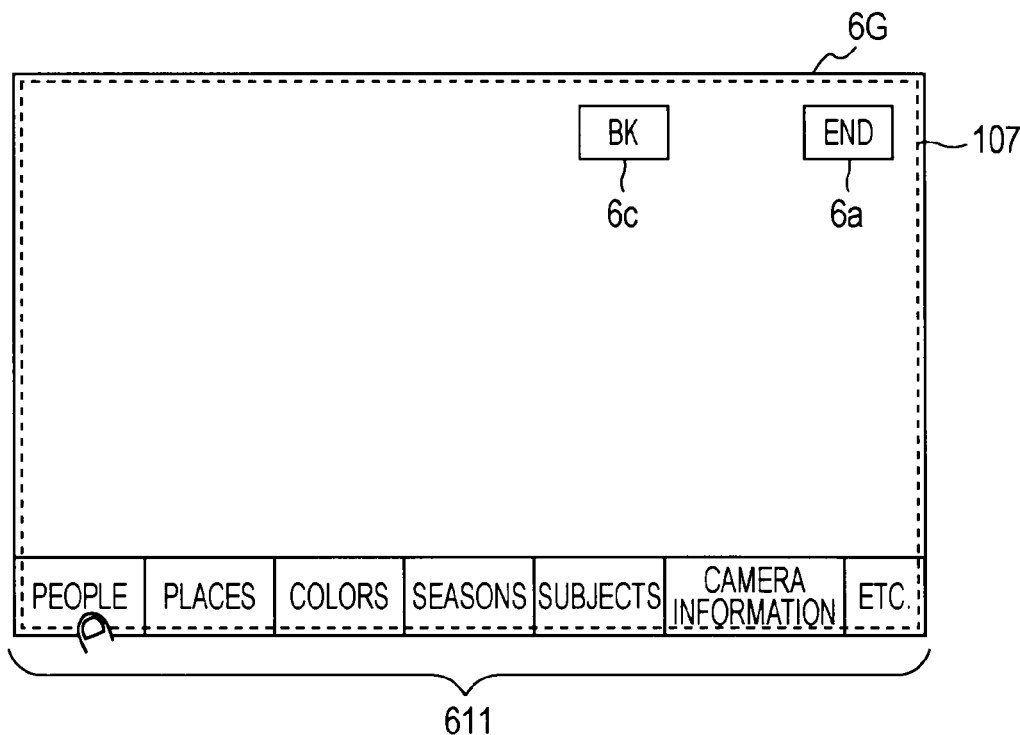

As shown in FIG. 5B, the search key selection screen (1) has an end icon 6a and an BK icon 6c, and also category list display 611 the lower edge portion of the display screen 6G.

The category list display 611 is formed based on the category information of the search key candidate table described with reference to FIG. 4, and as shown in FIG. 5B, has seven categories of people, places, colors, seasons, subjects, camera information, etc.

The user selects a category name to which the search key candidate information to be used as a search key is assumed to belong, from the displayed category list display 611. Specifically, the user selects a category name by bringing the finger or the like into contact with the position on the operating surface of the touch panel 107 corresponding to the display position of the target category name.

The control unit 120 recognizes what kind of instruction input has been performed by the user, based on the coordinate data from the touch panel 107, and display information displayed on the position on the display screen 6G corresponding to the position on the operating surface of the touch panel 107 indicated with this coordinate data.

Now, as shown in FIG. 5B, let us say that the finger or the like is brought into contact with the position on the operating surface of the touch panel 107 corresponding to the display position of the category "people" by the user. In this case, the control unit 120 determines that the category "people" has been selected, and forms a search key selection screen (2) having a list display (search key candidate display) 621 of the search key candidate information belonging to the category "people", and displays this on the display screen 6G of the display unit 106.

Note that, in FIG. 5B, in the case that the end icon 6a has been selected, the control unit 120 ends the image search processing, and for example, returns to a state in which the menu screen is displayed. Also, in FIG. 5B, in the case that the BK icon 6c has been selected, the control unit 120 returns to the search range setting screen described with reference to FIG. 5A, whereby setting of a search range can be performed again.

Figure 6A:
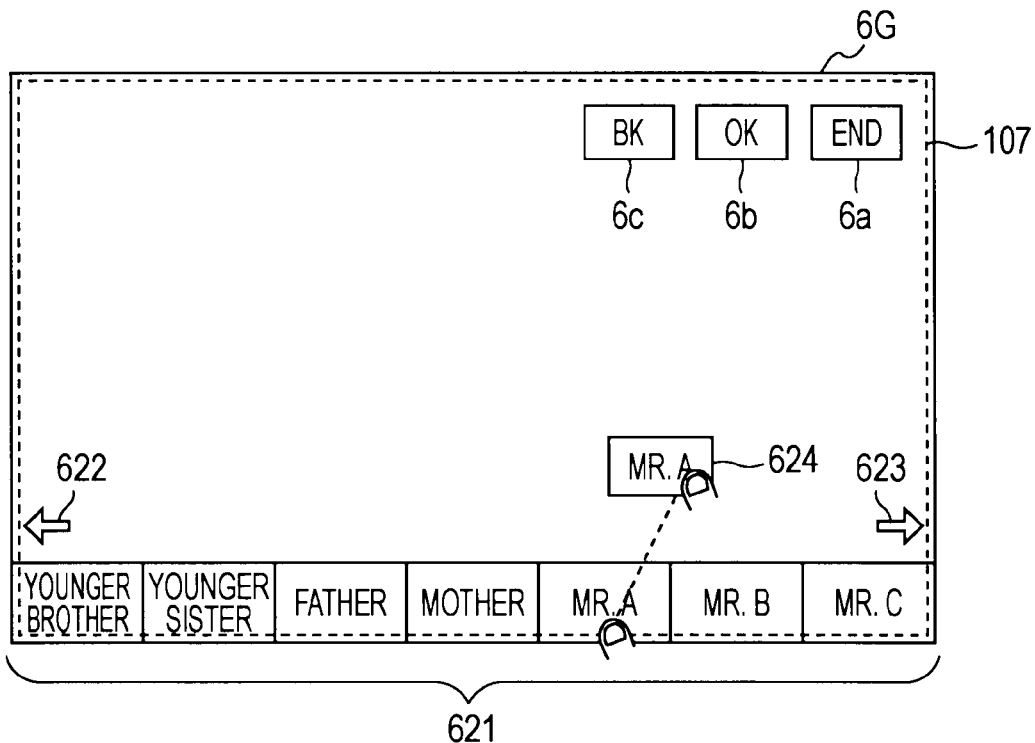
FIGS. 6A and 6B are diagrams for describing processing for selecting a search key used for image search from search key candidate information registered in the search key candidate information table.

As shown in FIG. 6A, the search key selection screen (2) has an end icon 6a, an OK icon 6b, and a BK icon 6c, and also has search key candidate display 621 on the lower edge portion of the display screen 6G.

The search key candidate display 621 is a list of search key candidate information belonging to the category "people" selected at the search key selection screen (1) of the previous stage. Also, as shown in FIG. 6A, in the case of the search key selection screen (2), a left arrow icon 622 and a right arrow icon 623 for scrolling the search key candidate display are provided.

In this case, upon a tapping operation being performed as to the left arrow icon 622, the control unit 120 scrolls the search key candidate display 621 from the right side to the left side for one search key candidate worth. A tapping operation is repeated as to the left arrow icon 622, whereby the search key candidate display 621 can be scrolled from the right side to the left side for one search key candidate worth in order.

Similarly, upon a tapping operation being performed as to the right arrow icon 623, the control unit 120 scrolls the search key candidate display 621 from the left side to the right side for one search key candidate worth. A tapping operation is repeated as to the right arrow icon 623, whereby the search key candidate display 621 can be scrolled from the left side to the right side for one search key candidate worth in order.

These left arrow icon 622 and right arrow icon 623 are operated, the search key candidate display is scrolled, and in the case that target search key candidate information is displayed, an operation for selecting the search key candidate information thereof is performed.

Note that, in the case that the left and right arrow icons 622 and 623 are not used, for example, with the operating surface of the touch panel 107, a tracing operation in the left direction or a tracing operation in the right direction is performed, whereby the search key candidate display can also be scrolled.

For example, let us say that, in FIG. 6A, item "Mr. A" of the search key candidate display is search key candidate information that the user intends to set as a search key. In this case, the user brings the finger or the like into contact with the position on the operating surface of the touch panel 107 corresponding to the display position of the item "Mr. A", and performs a tracing operation (dragging operation or flicking operation).

The control unit 120 recognizes, as described above, that a tracing operation has been performed from the display position of the item "Mr. A", based on the coordinate data from the touch panel 107, and the display position on the display screen 6G of each piece of display information.

In this case, the control unit 120 recognizes that the item "Mr. A" has been selected as a search key, and displays display 624 of "Mr. A" selected as a search key outside the display of the search key candidate display 621 on the display screen 6G. Thus, the user can recognize that the item "Mr. A" has been able to be selected as a search key at the imaging apparatus 100.

Similarly, other items belonging to the category "people" can also be selected as search keys. That is to say, multiple items (search key candidate information) can also be selected as search keys within the same category.

Subsequently, after the item "Mr. A" has been selected as a search key, in the case of intending to end the image search itself, the user selects the end icon 6a. Thus, the control unit 120 ends the image search processing, and for example, returns to a state in which the menu is displayed. In this case, the selected search key is determined not to have been selected.

Also, after the item "Mr. A" has been selected as a search key, in the case of intending to perform selection of category again, the user selects the BK icon 6c. Thus, the control unit 120 allows the user to return to the search key selection screen (1) described with reference to FIG. 5B, and to perform selection of category again. In this case, the item "Mr. A" is determined not to have been selected as a search key.

Also, after the item "Mr. A" has been selected as a search key, in the case of the OK icon 6b being selected, the control unit 120 determines the item "Mr. A" selected in FIG. 6A as a search key.

Figure 6B:
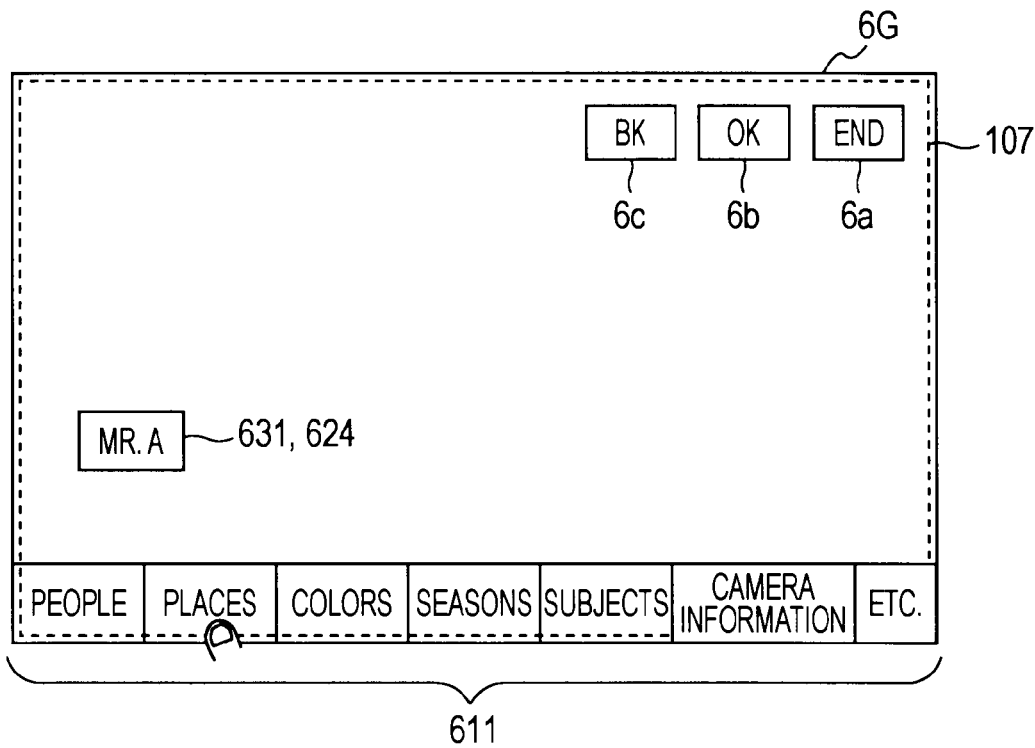

Subsequently, the control unit 120 forms, as shown in FIG. 6B, a search key selection screen (3) having the display 631 of the item "Mr. A" determined as a search key, and having the category list display 611 displayed again, and displays this on the display screen 6G of the display unit 106. Thus, a category of the search key candidate information table can be allowed to be selected newly.

In a state of FIG. 6B, in the case of intending to end the image search itself, the user selects the end icon 6a. Thus, the control unit 120 ends the image search processing, and for example, returns to a state in which the menu is displayed.

Also, in the case of intending to perform selection of a search key at the category "people" again, the user selects the BK icon 6c. Thus, the control unit 120 returns to the search key selection image (2) described with reference to FIG. 6A, and allows the user to perform selection of a search key at the category "people" again.

In this case, according to the control of the control unit 120, the already selected search key can be canceled, the already selected search key can be canceled to select a new search key, or a search key can further be selected in addition to the already selected search key.

Also, in a state of FIG. 6B, in the case that selection of a search key has been completed, and the image search has been executed using the selected search key, the user selects the OK icon 6b. Thus, the control unit 120 eliminates the category list display 611 in FIG. 6B, and allows the user to execute the image search processing.

In this case, the control unit 120 accepts a predetermined operation for instructing display of the initial screen of the image search to execute the image search according to the selected search key, which will be described later.

In the case of that this predetermined operation has been accepted, the control unit 120 executes processing for displaying the initial screen of the image search. Specifically, the control unit 120 reads out the image data of the search range set in FIG. 5A, and controls the decompression processing unit 110, display image forming unit 111, and display processing unit 105 to display the thumbnail images of images in the search range on the whole screen of the display screen 6G at random (in a scattered manner).

Also, the control unit 120 controls the display image forming unit 111, and display processing unit 105 to display the search key display (the display corresponding to the display 631 shown in FIG. 6B) corresponding to the search key to be selected such as described with reference to FIGS. 5A through 6B on the display screen 6G.

Subsequently, the control unit 120 waits for a specifying operation (contact operation), which is an operation for instructing start of the image search, as to the search key display corresponding to the selected search key. Subsequently, in the case that this specifying operation has been performed, the control unit 120 executes the image search processing based on the selected search key, though description will also be made later.

Also, in a state of FIG. 6B, in the case of further performing selection of a search key, in the same way as with the case described with reference to FIG. 5B, the user selects a category name to which search key candidate information to be used as a search key is assumed to belong. That is to say, the user brings the finger or the like into contact with the position on the operating surface of the touch panel 107 corresponding to the display position of a target category name, thereby selecting the category name.

Now, as shown in FIG. 6B, let us say that the finger or the like is brought into contact with the position on the operating surface of the touch panel 107 corresponding to the display position of the category "places" by the user. In this case, the control unit 120 determines that the category "places" has been selected, and forms a search key selection screen (4) having a list display (search key candidate display) 641 of the search key candidate information belonging to the category "places" shown in FIG. 7A, and displays this on the display screen 6G of the display unit 106.

Figure 7A:
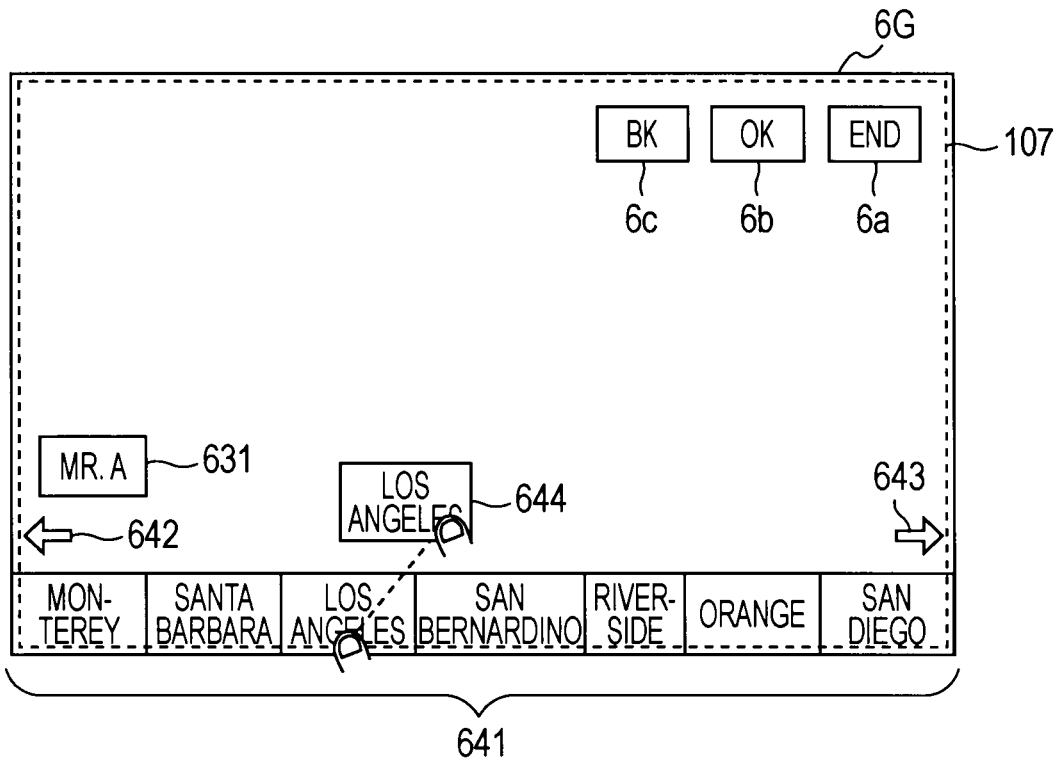
FIGS. 7A and 7B are diagrams for describing processing for selecting a search key used for image search from search key candidate information registered in the search key candidate information table.

As shown in FIG. 7A, the search key selection screen (4) has an end icon 6a, an OK icon 6b, and a BK icon 6c, and also has search key candidate display 641 on the lower edge portion of the display screen 6G.

The search key candidate display 641 is a list of search key candidate information belonging to the category "places" selected at the search key selection screen (3) of the previous stage. Also, as shown in FIG. 7A, in the search key selection screen (4), a left arrow icon 642 and a right arrow icon 643 for scrolling the search key candidate display are provided.

In this case, upon a tapping operation being performed as to the left arrow icon 642, the control unit 120 scrolls the search key candidate display 641 from the right side to the left side for one search key candidate worth. A tapping operation is repeated as to the left arrow icon 642, whereby the search key candidate display 641 can be scrolled from the right side to the left side for one search key candidate worth in order.

Similarly, upon a tapping operation being performed as to the right arrow icon 643, the control unit 120 scrolls the search key candidate display 641 from the left side to the right side for one search key candidate worth. A tapping operation is repeated as to the right arrow icon 643, whereby the search key candidate display 641 can be scrolled from the left side to the right side for one search key candidate worth in order.

These left arrow icon 642 and right arrow icon 643 are operated, the search key candidate display is scrolled, and in the case that target search key candidate information is displayed, an operation for selecting the search key candidate information thereof is performed.

For example, let us say that, in FIG. 7A, item "Los Angeles" of the search key candidate display is search key candidate information that the user intends to set as a search key. In this case, the user brings the finger or the like into contact with the position on the operating surface of the touch panel 107 corresponding to the display position of the item "Los Angeles", and performs a tracing operation (dragging operation or flicking operation).

The control unit 120 recognizes that a tracing operation has been performed from the display position of the item "Los Angeles", based on the coordinate data from the touch panel 107, and the display position on the display screen 6G of each piece of display information.

In this case, the control unit 120 recognizes that the item "Los Angeles" has been selected as a search key, and displays display 644 of "Los Angeles" selected as a search key outside the display of the search key candidate display 641 on the display screen 6G. Thus, the user can recognize that the item "Los Angeles" has been able to be selected as a search key at the imaging apparatus 100.

Similarly, other items belonging to the category "places" can also be selected as search keys. That is to say, multiple items (search key candidate information) can also be selected as search keys within the same category.

Subsequently, after the item "Los Angeles" has been selected as a search key, in the case of intending to end the image search itself, the user selects the end icon 6a. Thus, the control unit 120 ends the image search processing, and for example, returns to a state in which the menu is displayed. In this case, the selected search key is determined not to have been selected.

Also, after the item "Mr. A" and the item "Los Angeles" have been selected as search keys, in the case of intending to perform selection of category again, the user selects the BK icon 6c. Thus, the control unit 120 allows the user to return to the search key selection screen (3) described with reference to FIG. 6B, and to perform selection of category again. In this case, the item "Los Angeles" is determined not to have been selected as a search key.

Also, after the item "Mr. A" and the item "Los Angeles" have been selected as search keys, in the case of the OK icon 6b being selected, the control unit 120 determines the item "Los Angeles" selected in FIG. 7A as a search key.

Figure 7B:
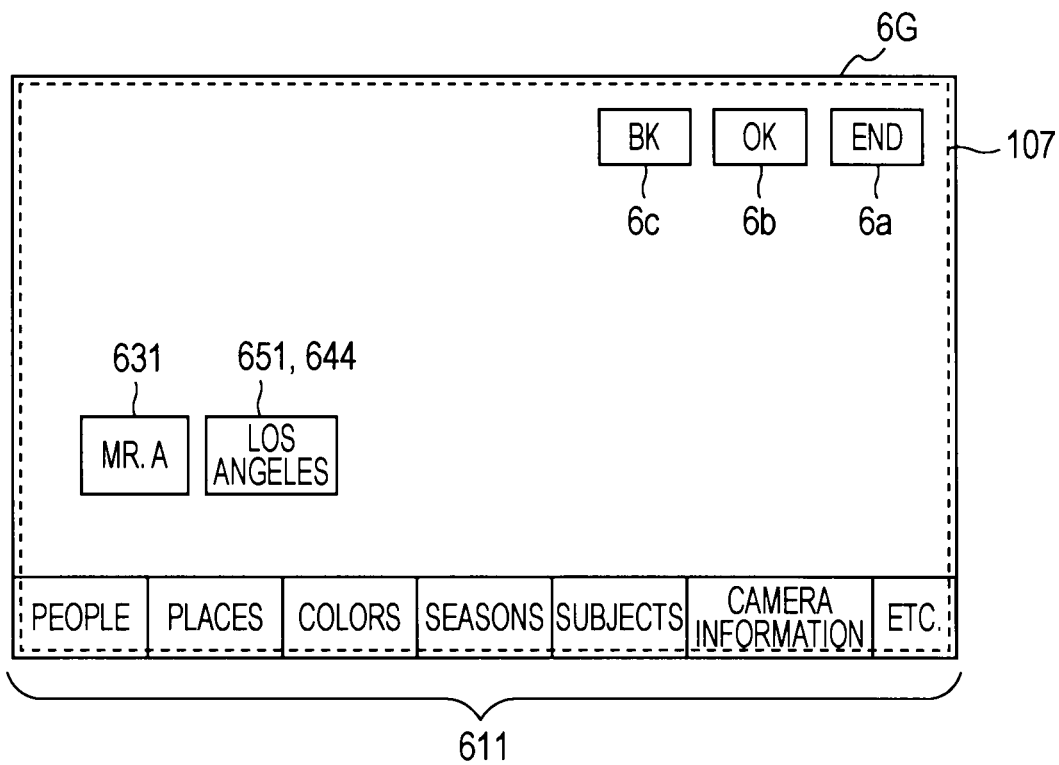

Subsequently, the control unit 120 forms, as shown in FIG. 7B, a search key selection screen (5) having the display 631 of the item "Mr. A" and the display 651 of the item "Los Angeles" determined as search keys, and having the category list display 611 displayed again, and displays this search key selection screen (5) shown in FIG. 7B on the display screen 6G of the display unit 106.

Thus, the user can be arrowed to select and determine one or more pieces of search key candidate information as search keys regarding a relevant category of the seven categories of the search key candidate information table.

Accordingly, the user can be arrowed to select a plurality of search key candidate information from the same category as search keys, or to select one or more pieces of search key candidate information from each of a plurality of categories as search keys.

Subsequently, in a state of FIG. 7B, in the case of intending to end the image search itself, the user selects the end icon 6a. Thus, the control unit 120 ends the image search processing, and for example, returns to a state in which the menu is displayed. In this case, selection of a search key is determined not to have been performed.

Also, in the case of intending to perform selection of a search key at the category "places" again, the user selects the BK icon 6c. Thus, the control unit 120 returns to the search key selection image (4) described with reference to FIG. 7A, and allows the user to perform selection of a search key at the category "places" again.

In this case, according to the control of the control unit 120, the already selected search key can be canceled, the already selected search key can be canceled to select a new search key, or a search key can further be selected in addition to the already selected search key.

Also, in a state of FIG. 7B, in the case that selection of a search key has been completed, and the image search will be executed using the selected search keys, the user selects the OK icon 6b. Thus, the control unit 120 eliminates the category list display 611 in FIG. 7B, and allows the user to execute the image search processing.

In this case, the control unit 120 accepts, as also described above, a predetermined operation for instructing display of the initial screen of the image search to execute the image search according to the selected search keys.

In the case of that this predetermined operation has been accepted, the control unit 120 executes processing for displaying the initial screen of the image search. Specifically, the control unit 120 reads out the image data of the search range set in FIG. 5A, and controls the decompression processing unit 110, display image forming unit 111, and display processing unit 105 to display the thumbnail images of images in the search range on the whole screen of the display screen 6G at random (in a scattered manner).

Also, the control unit 120 controls the display image forming unit 111, and display processing unit 105 to display the search key displays (the displays corresponding to the display 631 and display 651 shown in FIG. 7B) corresponding to the search keys to be selected such as described with reference to FIGS. 5A through 7B on the display screen 6G.

Subsequently, the control unit 120 waits for a specifying operation (contact operation), which is an operation for instructing start of the image search, as to the search key displays corresponding to the selected search keys. Subsequently, in the case that this specifying operation has been performed, the control unit 120 executes the image search processing based on the selected search keys, though description will also be made later.

Note that the search key selection processing described with reference to FIGS. 5A through 7B is an example, and with a mode different from this, a target search key may also be selected from the search key candidate information.

Predetermined Operation for Instructing Display of Initial Screen of Image Search Subsequently, such as described with reference to FIGS. 5A through 7B, upon the range of the image search being specified, a search key being selected, and the OK icon 6b being operated, as also described above, the imaging apparatus 100 goes into a waiting state for accepting a predetermined operation for displaying the initial screen of the image search.

Figure 8:
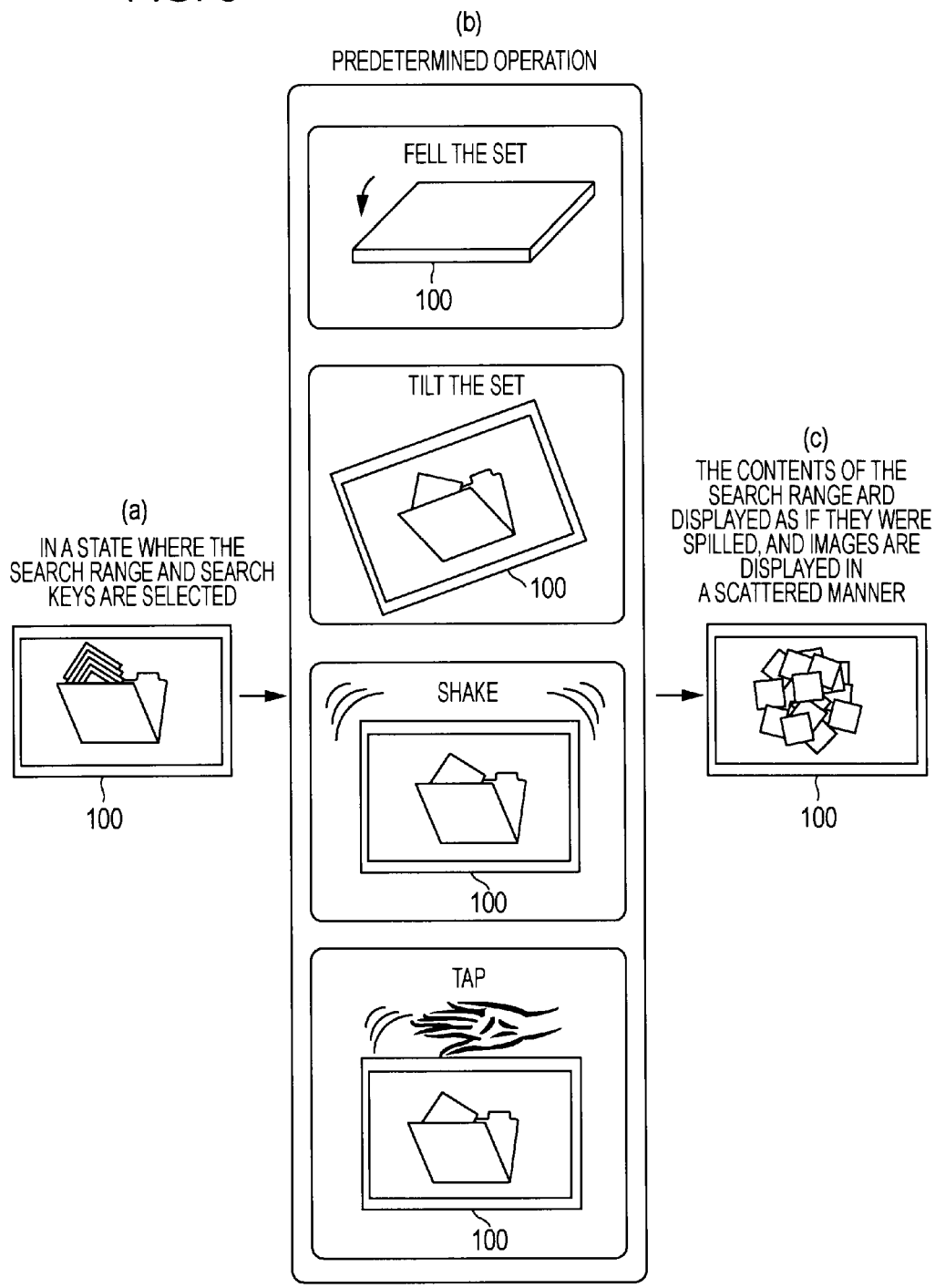
FIG. 8 is a diagram for describing available operations serving as predetermined operations for displaying an image search initial screen after a search key for image search has been selected.

FIG. 8 is a diagram for describing available operations to be performed as a predetermined operation for displaying the initial screen of the image search after a search key for the image search has been selected.

Let us say that (a) in FIG. 8 illustrates a state in which the selection processing of a search key used for the image search, which has been described with reference to FIGS. 5A through 7B, has been executed, and the search range and the search key has been selected. In this state, as shown in (b) in FIG. 8, an operation for laying over the imaging apparatus 100, an operation for tilting the imaging apparatus 100, an operation for shaking the imaging apparatus 100, and an operation for tapping the imaging apparatus 100 are detected as a predetermined operation for instructing display of the initial screen of the image search.

In the case that such an operation has been performed as to the imaging apparatus 100, the motion sensor 137 of the imaging apparatus 100 detects the motion of the imaging apparatus 100 according to each of the operations to notify the control unit 120 of the detection result thereof.

The control unit 120 can determine what kind of operation has been performed as to the imaging apparatus 100 based on the detection output from the motion sensor 137. Subsequently, in the case of determining that one of the operations shown in (b) in FIG. 8, i.e., an operation such as being laid over, being tilted, being shaken, or being tapped, has been performed, the control unit 120 displays the initial screen of the image search.

Specifically, the control unit 120 reads out the image data in the search range set in FIG. 5A, supplies this to the decompression processing unit 110, subjects this to decompression processing to restore the original image data before data compression, and supplies this to the display image forming unit 111.

The display image forming unit 111 forms thumbnail data for forming a thumbnail image (reduction image) by subjecting the image data from the decompression processing unit 110 to thinning processing or the like, and also forms an image signal for displaying an image where thumbnail images are disposed on the display screen in a scattered manner.

The image signal formed at the display image forming unit 111 is supplied to the display processing unit 105, and is converted into a signal in a format supplied to the display unit 106, and is then supplied to the display unit 106. Thus, the thumbnail images of image files in the search range are displayed on the display screen 6G in a scattered manner such as shown in (c) in FIG. 8.

Also, the control unit 120 forms, as also described above, the search key display (search key icon) corresponding to the selected search key, processes this via the display image forming unit 111 and the display processing unit 105, and displays this on the display screen 6G.

Thus, the thumbnail images of the image files in the search range are displayed in a scattered manner, and also the initial screen of the image search where the search key display corresponding to the selected search key is displayed is displayed.

Thus, with the imaging apparatus 100 according to the present embodiment, after the search range and the search key have been selected prior to the image search, as shown in (b) in FIG. 8, in the case that a simple operation such as laying over, tilting, shaking, or tapping has been performed, the initial screen of the image search can be displayed.

Note that description has been made here assuming that in the case of displaying the initial screen of the image search, thumbnail data for thumbnail image display is formed by subjecting the image data of the image file to be searched to thinning processing or the like. However, the present invention is not restricted to this.

Preliminarily, thumbnail data is formed based on the image data of each image file, and is added to this image file, whereby the thumbnail data added to the image file can be used.

In this case, the decompression processing at the decompression processing unit 110, and the thumbnail data forming processing at the display image forming unit 111 do not have to be executed, and accordingly, the load on the imaging apparatus 100 can be reduced.

Also, the motion sensor 137 of the imaging apparatus 100 according to the present embodiment can detect a case where the imaging apparatus 100 has been shaken in the horizontal direction, and a case where the imaging apparatus 100 has been shaken in the vertical direction, separately. Therefore, the motion sensor 137 can also determine according to the shaken direction, for example, the case of being shaken in the horizontal direction to be the display instruction of the initial screen of the image search, and the case of being shaken in the vertical direction to be the display instruction of the initial screen of the image search.

It goes without saying that in the case of being shaken in the horizontal direction, and in the case of being shaken in the vertical direction, this may be determined to be the display instruction of the initial screen of the image search.

Also, the imaging apparatus 100 according to the present embodiment includes the touch panel on the set upper portion 136. Therefore, with regard to an operation for tapping the imaging apparatus 100, in the case that an operation for repeatedly touching the touch panel on the set upper portion 136 has been detected, the imaging apparatus 100 may be determined to be tapped.

Screen Transition Example when Executing Image Search

Figure 9:
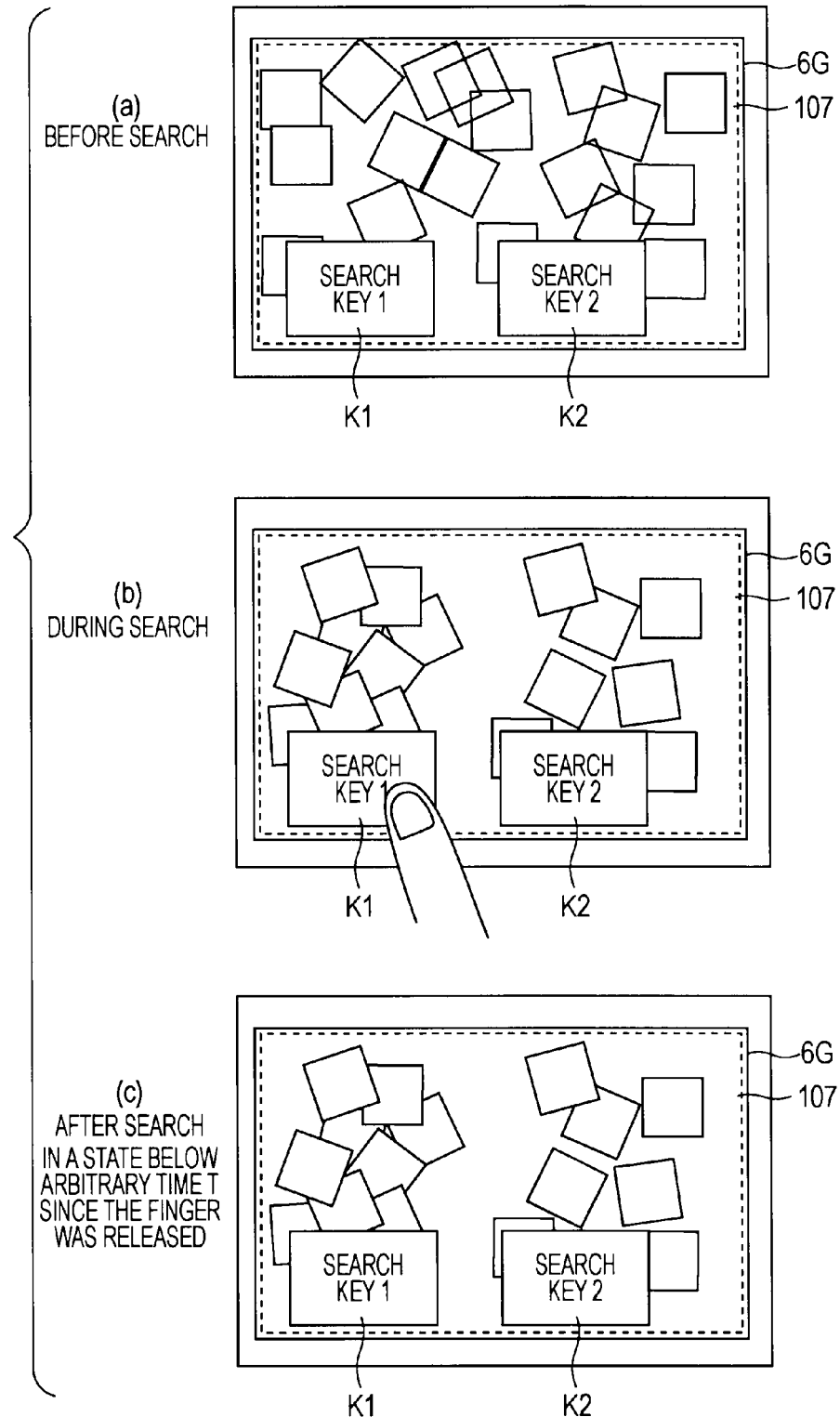
FIG. 9 is a diagram for describing a screen transition example in the case of executing image search from a state in which two search keys are selected.
Figure 10:
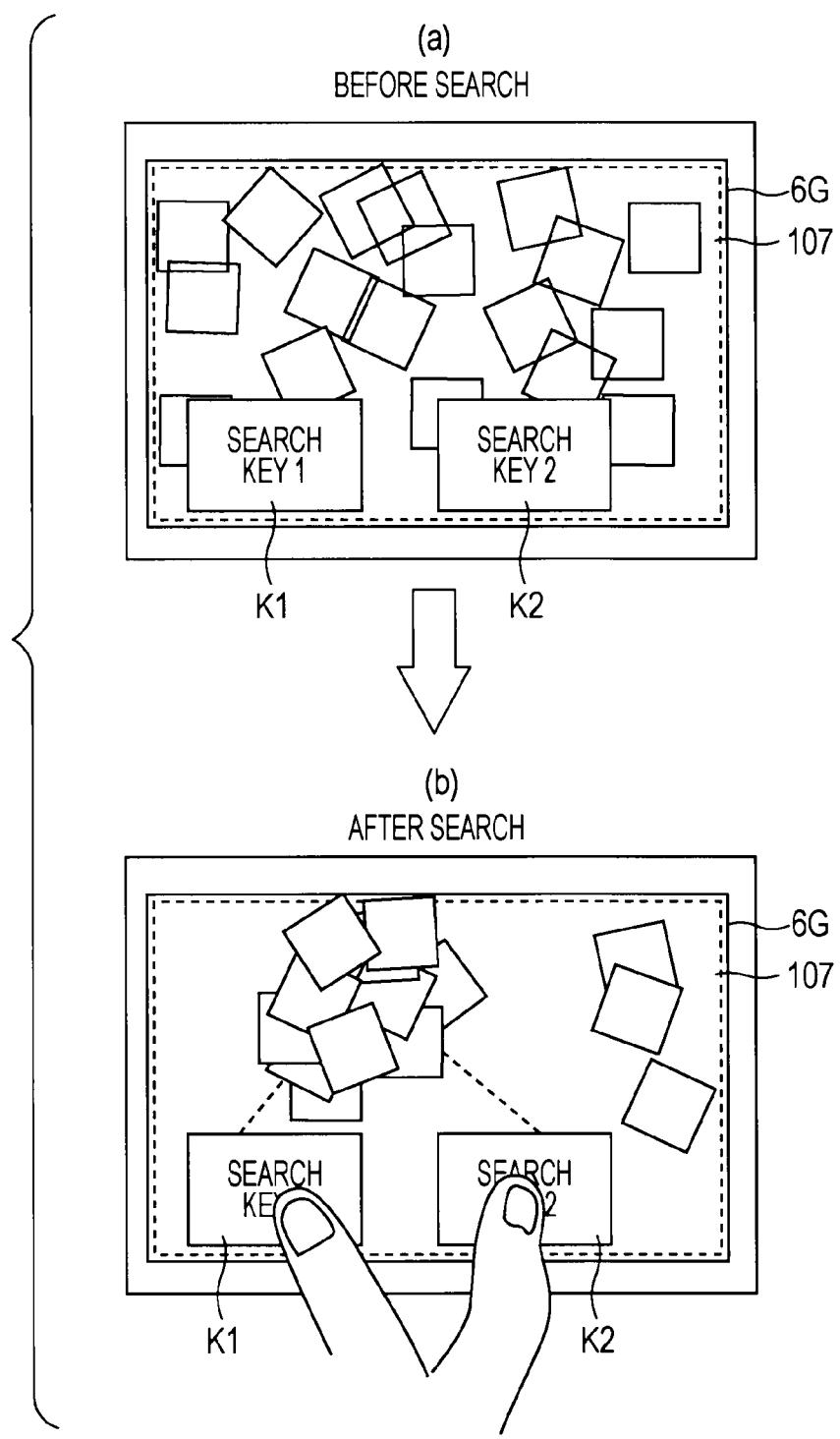
FIG. 10 is a diagram for describing a case where image search is executed using both of selected two search keys.

Next, as described above, description will be made regarding a screen transition example in the case that after a search key has been selected by the user, the image search is executed using the selected search key. FIG. 9 through FIG. 11 are diagrams for describing a screen transition example in the case that two search keys have been selected such as described with reference to FIGS. 5A through 7B, a predetermined operation has been performed such as described with reference to FIG. 8, and the image search is executed.

Case of Using One Search Key

As also described above, two target search keys are selected, the OK icon 6b is selected, and then a predetermined operation is performed such as described with reference to FIG. 8, whereby the control unit 120 displays the initial screen of the image search screen on the display screen 6G such as shown in (a) in FIG. 9.

The initial screen of the image search shown in (a) in FIG. 9 is a screen where the search key displays (search key icons) K1 and K2 corresponding to the search keys selected by the user are displayed, and also images in the search range are displayed in a scattered manner.

Note that let us say that hereinafter, of the search keys selected by the user, the search key corresponding to the search key display K1 is a search key k1, and the search key corresponding to the search key display K2 is a search key k2.

Of the selected two search keys, in the case that the image search corresponding to the search key k1 corresponding to the search key display K1 is executed, the user brings the finger or the like into contact with the position on the touch panel 107 corresponding to the display position of the search key display K1, as shown in (b) in FIG. 9.

The control unit 120 detects that the search key display K1 has been specified based on the coordinate data from the touch panel 107, and the display information displayed on the position on the display screen corresponding to the position on the operating surface that this coordinate data indicates, and recognizes that there has been received an instruction for executing the image search.

In this case, the control unit 120 uses the search key k1 corresponding to the specified search key display K1 to extract image files having a keyword matched with this search key from the image files belonging to the search range.

Subsequently, the control unit 120 displays the thumbnail images of the image files determined to be matched with the search key k1 and extracted regarding the image files in the search range on predetermined positions (e.g., in the vicinity of the search key display K1) on the display image 6G so as to be collected thereon.

The control unit 120 displays the thumbnail images of image files that have not been extracted according to the search key on positions separated from the predetermined positions on the display screen 6G, even if these image files are image files in this search range.

Thus, as shown in (b) in FIG. 9, the images of image files having a keyword matched with the search key k1 are collected and displayed around the search key display K1, and the images of image files other than those files are displayed on positions distant from the search key display K1.

Note that, with processing for displaying thumbnail images such as shown in (b) in FIG. 9, the thumbnail images are subjected to image processing by the decompression processing unit 110, display image forming unit 111, and display processing unit 105 which operate in accordance with to the control of the control unit 120, and are displayed on the display screen 6G of the display unit 106.

Specifically, the image data of the image files in the search range is subjected to decompression processing at the decompression processing unit 110, and is supplied to the display image forming unit 111. The display image forming unit 111 forms thumbnail data by subjecting the image supplied thereto to thinning processing or the like.

Subsequently, the display image forming unit 111 forms image data in accordance with the control of the control unit 120 wherein the thumbnail images having a keyword matched with the search key k1 are displayed in the vicinity of the display position of the search key display K1, and the thumbnail images other than those are displayed on a position distant from the search key display K1.

This image data is image data for forming one screen worth of image. The display image forming unit 111 forms an image signal to be supplied to the display processing unit 105 from this image data, and supplies this to the display processing unit 105. In accordance with the control from the control unit 120, the display processing unit 105 forms an image signal for display to be supplied to the display unit 106, and supplies this to the display unit 106. Thus, in the mode shown in (b) in FIG. 9, display of the results of the image search is executed on the display screen 6G of the display unit 106.

Note that, as also described above, in the case that thumbnail data for displaying thumbnail images has already been prepared in each image file, display shown in FIG. 9 is executed using the thumbnail data thereof.

In the case that the thumbnail data prepared in each image file beforehand is used, as also described above, the decompression processing at the decompression processing unit 110, and the thumbnail data forming processing at the display image forming unit 111 do not have to be executed, and accordingly, the load on the imaging apparatus 100 can be reduced.

Thus, the user can recognize that the image search has been executed using the search key k1 corresponding to the search key display K1, and the results of the image search in accordance with the information displayed on the display screen 6G.

Also, as shown in (b) in FIG. 9, the user can be allowed to recognize the outline of an image group matched with the search key, and the outline of an image group not matched with the search key, whereby the user can perform the image search in a mode understandable for the user.

After contact of the user's finger or the like as to the search key display K1 is released, the control unit 120 maintains display of the results of the image search for a certain period of time T (e.g., several seconds or so). While this display is maintained, the user can be allowed to determine the results of the image search.

Case of Using Two Search Keys

Also, in the case of the example described with reference to FIG. 9, of the selected two search keys, the image search has been executed using one of the search keys that is specified by the user. However, the present invention is not restricted to this. The image search may be executed using both of the selected two search keys.

FIG. 10 is a diagram for describing a case where the image search is executed using the selected two search keys. As shown in (a) in FIG. 10, search key display K1 and search key display K2 are displayed corresponding to the two search keys selected by the user.

Subsequently, as shown in (b) in FIG. 10, let us say that the user brings the fingers or the like into contact with both of the search key display K1 and the search key display K2. Specifically, the user brings the fingers or the like into contact with the operating surface of the touch panel 107 corresponding to the display positions of both of the search key display K1 and the search key display K2, respectively.

In this case, the coordinate data of each of the two contact positions is supplied to the control unit 120 from the touch panel 107. Subsequently, the control unit 120 detects that the search keys k1 and k2 have been specified simultaneously, based on the coordinate data from the touch panel 107, and the display information displayed on the position on the display screen corresponding to the position on the operating surface that this coordinate data indicates.

In this case, the control unit 120 searches and extracts image files having both of the search key k1 and the search key k2 as keywords, and displays the thumbnail images of the extracted image files on the display screen 6G so as to be collected such as shown in (b) in FIG. 10.

The control unit 120 displays the thumbnail images of image files having none of the search key k1 and the search key k2 as keywords on a position distant from the image group displayed so as to be collected, in a scattered manner.

Such display can also be executed, in the same way as with the case described with reference to FIG. 9, by the control unit 120 controlling the decompression processing unit 110, display image forming unit 111, and display processing unit 105.

Thus, the image search using multiple search keys can be executed in a flexible manner. Note that description has been made here regarding a case where two search keys are used, as an example, but the present invention is not restricted to this. The image search may be executed by selecting two or more search keys, and using each thereof simultaneously.

Also, with the example shown in FIG. 10, an image file that satisfies the search key k1 and the search key k2 simultaneously is searched. However, the present invention is not restricted to this. An image file that satisfies one of the search key k1 and the search key k2 may be searched.

That is to say, whether to search an image file satisfying all of the multiple search keys, or whether to search an image file satisfying at least one of the multiple search keys may be set to the imaging apparatus 100 beforehand.

It goes without saying that whether to execute which search may be input and set to the imaging apparatus 100 at the time of the start of the image search.

Case Using Images as Search Keys

With the imaging apparatus 100 according to the above embodiment, image files having a keyword matched with a search key have been searched. That is to say, the above embodiment is a case where a search key is keyword information.

However, search keys are not restricted to keyword information. Similar images may be searched with an image itself, specifically, the information of the results of image analysis as a search key. With the imaging apparatus 100 according to this example, the image search is executed using an image itself as a search key.

FIG. 11 is a diagram for describing a case where images are used as search keys to execute the image search. As shown in (a) in FIG. 11, images to be able to be used as a search key are displayed in a distinguishable mode, for example, such as highlight display or the like.

As described with reference to FIG. 2, with each image file, image analysis information obtained by subjecting the image data of the image file to image analysis is added thereto as metadata. With this image analysis information, as also described above, various techniques such as edge detection, color analysis, and the like are used, whereby the features of the image according to each piece of image data can be shown by digitalizing, the similarity of picture compositions and subjects can be compared between images.

Therefore, as a result of the image analysis, an image that has been determined to be an image having clear features, for example, such as an image where a person's face is greatly taken, an image of a building or scenery having a clear outline, is arranged to be able to be used as a search key.

Specifically, the image file of an image that can be used as a search key is arranged to be distinguishable by turning on a flag of the image file of an image that is available as a search key, or the like. Thus, as shown in (a) in FIG. 11, the thumbnail image of an image to be able to become a search key can be distinguishable with highlight display or the like.

Subsequently, as shown in (b) in FIG. 11, the user brings the fingers or the like into contact with the operating surface of the touch panel 107 on the display positions of the thumbnail images of target images.

In this case, the control unit 120 can recognize which thumbnail image has been specified as a search key based on the coordinate data from the touch panel 107, and the thumbnail image displayed on the position on the display screen corresponding to the position on the operating surface indicated with this coordinate data.

The control unit 120 reads out image analysis information from the image file corresponding to the specified thumbnail image, and with this image analysis information as a search key, extracts an image file having image analysis information similar to this search key. Subsequently, the control unit 120 displays, as shown in (b) in FIG. 11, the thumbnail images of the extracted image files by gathering these together into a predetermined position on the display screen.

In the case of the example shown in FIG. 11, the case where two thumbnail images have been specified so as to become search keys is illustrated. Subsequently, in the case of this example, images similar to both of the image analysis results of the specified two images are extracted. Note that it is possible to extract an image similar to one of the image analysis results of the specified two images according to the user's instructions.

Thus, an image is specified as a search key, whereby images can be narrowed down with a person or building or the like taken in this image as a search condition. That is to say, images similar to the image specified as a search key can be extracted.

Note that description has been made assuming that as a result of image analysis, images having clear features are determined beforehand to be an image that can be specified as a search key. However, the present invention is not restricted to this. It goes without saying that all the images may be able to be specified as a search key. In this case, the thumbnail images do not have to be displayed in a highlight manner.

Also, the user herself/himself may set an image to be used as a search key beforehand.

Search of Image Files Having Information Similar to Search Keys

Description has been made that, in the case of the above image search, image files having a keyword matched with the specified search key (character information) can be searched, or image files having image data similar (relating) to the specified image (the image analysis information of the image) can be searched.

However, the present invention is not restricted to this. An arrangement may be made wherein image files having a keyword relating to the specified search key (character information) is searched. Also, even in the case of searching image files having image data relating to the specified image, image search according to an object can further be executed.

Description will be made below regarding a case where image files having a keyword similar to the specified search key (character information) are searched, and a case where image files having image data relating to the specified image are searched, and image search according to an object can further be executed.

Configuration Example of Search Key Degree-of-Association Dictionary

First, description will be made regarding a configuration for searching image data having information relating to a search key, in the case that the search key is character information. In this case, the imaging apparatus 100 according to the present embodiment uses a search key degree-of-association dictionary.

FIG. 12 is a diagram for describing a configuration example of the search key degree-of-association dictionary. With regard to character information having a possibility of being used as a search key, the search key degree-of-association dictionary summarizes character information (keyword) relating to that character information according to the degree of association as to that character information.

With the example shown in FIG. 12, related keywords are registered by being classified into three stages of the degrees of association "high", "medium", and "low" as to a search key. Here, the character information (keyword) of the degree of association "high" as to a search key is character information having the same character information, character information serving as a synonym, and the same character as to this search key, and indicating approximately the same meaning and content.

Also, the character information (keyword) of the degree of association "medium" as to a search key is character information directly linking to this search key as a general concept. Also, the character information (keyword) of the degree of association "low" as to a search key is character information as a general concept that rarely directly links to this search key, but can link to this search key by some keyword intervening between both.

With the example shown in FIG. 12, as for the keywords of the degree of association "high", "summer, summertime, early summer, summer vacation, . . . " and the like are registered as to the search key "summer". The keyword "summer" is a search key itself, the keyword "summertime" is a synonym of the search key "summer", the keywords "early summer, summer vacation" have the same characters as the search key "summer", and have generally the same meaning content, and accordingly, these are set to the degree of association "high".

Also, as the keywords of the degree of association "medium" as to the search key "summer", "sunflower, watermelon, fireworks show, sea, . . . " and the like are registered. The keywords "sunflower, watermelon" are seen principally in the "summer", and directly link to the search key "summer", and accordingly, are set to the degree of association "medium".

Also, the keyword "fireworks show" is principally a seasonal tradition of the "summer", directly links to the search key "summer", and accordingly, is set to the degree of association "medium". Also, the keyword "sea" frequently reminds people of the "summer", and accordingly, is set to the degree of association "medium".

Also, as the keywords of the degree of association "low" as to the search key "summer", "spring rains, homework, school, travel, . . . " and the like are registered. The keyword "spring rains" is a climatic state immediately before the summer, and does not remind people of the search key "summer" directly, but if the "spring rains" end, the "summer" will come, and accordingly, the keyword "spring rains" is set to the degree of association "low" as to the search key "summer".

Also, the keywords "homework, school, travel" can be correlated with the search key "summer" through, for example, the term "summer vacation", and accordingly, are set to the degree of association "low".

Thus, the search key degree-of-association dictionary is configured wherein related keywords are registered beforehand as to each of the terms having a possibility to be used as a search key by being classified into three stages of the degrees of association "high", "medium", and "low".

Note that character information having a possibility to be used as a search key is at least character information registered in the categories "people", "places", "colors", "seasons", and "subjects" of the search key candidate information table described with reference to FIG. 4.

Accordingly, a search key degree-of-association dictionary such as shown in FIG. 12 is formed for each piece of character information having a possibility to be used as a search key, and is stored and held in, for example, the EEPROM 124 or the like of the imaging apparatus 100.

Also, a search key degree-of-association dictionary that has been created is provided, but this is configured so as to be modified by the user for individual use.

Subsequently, in the case that the term "summer" is used as a search key in accordance with a configuration example of the search key degree-of-association dictionary shown in FIG. 12, image files (image data) having the keywords of the degrees of association "high", "medium", and "low" shown in FIG. 12 can be searched and extracted.

Subsequently, the extracted image files are classified according to the degrees of association thereof, whereby these can be handled for each of the degrees of association "high", "medium", and "low".

Example of Image Degree-of-Association Distinction Standard Based on Image Analysis Information Next, description will be made regarding a configuration for searching image files having information relating to a search key in the case that the search key is an image (image analysis information). In this case, the imaging apparatus 100 according to the present embodiment executes the image search based on the image analysis information.

In this case, it is important to execute the image search based on which information of the image analysis information. FIG. 13 is a diagram for describing information to be able to become a search key for the image search, of the image analysis information.

As described with reference to FIG. 2, the image analysis information obtained by analyzing the image data of each image file is added to each image file as metadata. As described above and also as shown in FIG. 13, the area of a person's face within an image, the number of persons who have been taken into an image, the degree of a person's smiling face who has been taken into an image, and information indicating the features of the whole image, and so forth are included in this image analysis information.

Upon the category "etc." being selected from the category list display 611 shown in FIG. 5B and the like, each piece of information shown in FIG. 13 is displayed as information making up the image analysis information, and target information is selected therefrom. Thus, the image search can be executed in accordance with the selected image analysis information.

For example, let us say that "the area of a person's face within an image" has been selected as the image analysis information, and an image to be used as a search key has been specified. In this case, the control unit 120 searches and extracts related images from the recording medium 135 based on "the area of a person's face within an image" of the image analysis information of the image specified as a search key.

Specifically, the control unit 120 searches and extracts from the recording medium 135 with an image of a first predetermined range as an image of the degree of association "high", with an image of a second predetermined range as an image of the degree of association "medium", and with an image of a third predetermined range as an image of the degree of association "low", of "the area of a person's face within an image".

In this case, the first predetermined range is a range closest to the area of a person's face within the image serving as the search key, and the second and third predetermined ranges are ranges gradually separated from the area of a person's face within the image serving as the search key.

Thus, in the case that "the area of a person's face within an image" of the image analysis information is used, images relating to the image serving as the search key can be searched and extracted, of an image to be used as the search key, with the area of a person's face within this image as a reference.

Also, let us say that "the number of persons within an image" has been selected as the image analysis information, and an image to be used as a search key has been specified. In this case, the control unit 120 searches and extracts related images from the recording medium 135 based on "the number of persons within an image" of the image analysis information of the image specified as a search key.

Specifically, the control unit 120 searches and extracts from the recording medium 135 with an image of a first predetermined range as an image of the degree of association "high", with an image of a second predetermined range as an image of the degree of association "medium", and with an image of a third predetermined range as an image of the degree of association "low", of "the number of persons within an image".

In this case, the first predetermined range is a range closest to the number of persons within the image serving as the search key, and the second and third predetermined ranges are ranges gradually separated from the number of persons within the image serving as the search key.

Thus, in the case that "the number of persons within an image" of the image analysis information is used, images relating to the image serving as the search key can be searched and extracted, of an image to be used as the search key, with the number of persons within this image as a reference.

Also, even in the case that "the degree of a person's smiling face within an image" that is the image analysis information is used, the control unit 120 can search related images from the recording medium 135 based on, of an image specified as the search key, "the degree of a person's smiling face within the image".

Also, even in the case that "the features of the whole image" that is the image analysis information is used, the control unit 120 can search related images from the recording medium 135 based on, of an image specified as the search key, "the features of the whole image".

In this case, an arrangement is made wherein similarity is obtained from the hue and complexity of an image, related images are extracted according to this similarity, and are classified into the degrees of association "high", "medium", and "low".

Thus, with the imaging apparatus 100 according to the present embodiment, the search key degree-of-association dictionary and the image analysis information are used, whereby images relating to a specified search key can be searched and extracted. Subsequently, the imaging apparatus 100 is configured so as to display searched and extracted images in accordance with the degree of association as to the search key.

Display Mode of Search Results of Image Files Having Information Relating to a Search Key Next, description will be made regarding a display mode of search results in the case that, as described above, after a search key has been selected by the user, and the image search has been executed using the selected search key thereof. Here, a case where a search key serving as character information has been selected will be described as an example.

FIG. 14 is a diagram for describing a display mode of search results in the case that the image search is executed from a state in which a single search key (character information) is selected, as described with reference to FIGS. 5A through 6B.

In FIG. 14, (A) is a diagram illustrating the display mode of search results in the case that the image search has been executed in accordance with the selected search key, and (B) is a diagram for describing the details of a search result display region Ar in (A).

As described with reference to FIGS. 5A through 6B, upon the user setting a search range of an image, selecting a single target search key, and then performing a predetermined operation as described with reference to FIG. 8, the control unit 120 displays the initial screen for the image search.

Specifically, the control unit 120 displays the images (thumbnail images) corresponding to the image data in the search range on the display screen 6G of the display unit 106 in a scattered manner. Also, the control unit 120 displays the search key display (search key icon) K1 corresponding to the selected search key on the display screen 6G of the display unit 106.

Subsequently, as shown in (A) in FIG. 14, upon the user bringing the finger or the like into contact with the position on the operating surface of the touch panel 107 corresponding to the display position of the search key display K1 displayed on the display screen 6G, the coordinate data indicating the contact position thereof is supplied from the touch panel 107 to the control unit 120.

The control unit 120 manages, as described above, what kind of information has been displayed where on the display screen 6G. Subsequently, the control unit 120 can detect that the search key display K1 has been specified, based on the coordinate data indicating the specified position on the operating surface from the touch panel 107, and the display information on the display screen 6G of the display unit 106 corresponding to the specified position thereof.

The control unit 120 recognizes that specifying of the search key display is for instructing to start the image search using the search key corresponding to the search key display thereof, and executes the image search using the selected search key. In this case, the control unit 120 references the search key degree-of-association dictionary configured as described with reference to FIG. 12, and searches and extracts image files having a keyword relating to the search key.

Subsequently, the control unit 120 displays the thumbnail images corresponding to the image data of the extracted image files on the position according to the degree of association of a keyword as to the search key. In the case of this example, the control unit 120 displays the image data obtained as search results on the position corresponding to the degree of association of a keyword as to the search key within the region indicated with the search result display region Ar on the display screen 6G.

That is to say, such that the search result display region Ar alone is shown in (B) in FIG. 14, the inside of the search result display region Ar is, in the outward direction from the center thereof, made up of a display region of the degree of association "high", a display region of the degree of association "medium", and a display region of the degree of association "low".

Accordingly, in the case of this example, the control unit 120 displays, in (B) in FIG. 14, the thumbnail images of image files having a keyword of which the degree of association is "high" as to the search key on an central portion ArH of the display region Ar.

Subsequently, the control unit 120 displays the thumbnail images of image files having a keyword of which the degree of association is "medium" as to the search key on a region ArM outside the display region of which the degree of association is "high", of the display region Ar.

Further, the control unit 120 displays the thumbnail images of image files having a keyword of which the degree of association is "low" as to the search key on a region ArL outside the display region ArM of which the degree of association is "medium", of the display region Ar.

Thus, the thumbnail images of the image files having a keyword of which the degree of association is "high", "medium", or "low" as to the search key can be displayed on the position corresponding to the degree of association thereof.

Note that, in the case of this example, with the image search, the control unit 120 searches and extracts, based on the search key and the search key degree-of-association dictionary, image files having a keyword relating to the search key from the image files stored in the recording medium 135.

The extracted image files are temporarily stored in, for example, the RAM 123, and the image data thereof is readout according to the degree of association thereof by the control unit 120, and is supplied to the decompression processing unit 110, where the image data is subjected to decompression processing, and the image data before data compression is restored.

Subsequently, the image data subjected to the decompression processing at the decompression processing unit 110 is supplied to the display image forming unit 111, where the image data is subjected to thinning processing or the like to form thumbnail data, and this is disposed on the position corresponding to the degree of association of the keyword possessed by itself as to the search key.

Thus, with the display image forming unit 111, the image data making up one screen worth of image is formed, this is converted into an image signal having a format to be supplied to the display processing unit 105, and this is supplied to the display processing unit 105.

Upon receiving supply of an image signal from the display image forming unit 111, the display processing unit 105 forms an image signal to be supplied to the display unit 106 from this, and supplies this to the display unit 106. Thus, the image having a keyword relating to the selected search key is displayed, such as shown in (A) in FIG. 14, on the position corresponding to the degree of association thereof on the display screen of the display unit 106.

Note that, as the degree of association decreases, the transparency regarding the images narrowed down is increased, or the luminosity thereof is decreased, whereby thumbnail images having a different degree of association can be displayed so as to be distinguished.

Thus, images having a keyword of which the degree of association differs as to the search key are displayed on the position corresponding to the degree of association thereof, whereby the user can confirm the results of the image search while having a consciousness of the difference thereof.

Also, instead of searching only images having a keyword matched with the search key in a traditional manner, images having a keyword relating to the search key can also be searched, and search results can be displayed while taking into consideration the difference between degrees of association. Accordingly, the image search can effectively be executed, and the results thereof can be used suitably.

Note that description has been made here assuming that with the display image forming unit 111, thumbnail data for displaying thumbnail images is formed by subjecting image data to thinning processing, or the like. However, the present invention is not restricted to this.

Processing for forming thumbnail data from image data can be burdensome. Therefore, an arrangement may be made wherein, with each image file, thumbnail data is formed from the image data beforehand, and this is held at each image file.

Thus, thumbnail data is formed and added to each image file beforehand, whereby the compression processing of the image data at the decompression processing unit 110, and the forming processing of the thumbnail data at the display image forming unit 111 can be omitted.

That is to say, in the case that each image file includes thumbnail data, the image files corresponding to the search key are extracted, and thumbnail data is read out from the image files thereof to supply this to the display image forming unit 111.

Thus, with the mode shown in FIG. 14, the search results, i.e., the thumbnail images of the image files having a keyword relating to the search key can be displayed on the position corresponding to the degree of association thereof.

Operations for Determining Image Search Results

With the imaging apparatus 100 according to the present embodiment, as described with reference to FIGS. 9 through 14, upon the image search using a search key being executed, and the results thereof being displayed on the display screen 6G of the display unit 106, the control unit 120 goes into a state for waiting for a predetermined operation for determining the search results.

FIG. 15 is a diagram for describing operations available as a predetermined operation for determining the results of the image search with the imaging apparatus 100 according to the present embodiment.

Let us say that (a) in FIG. 15 illustrates a state in which the image search is executed using the selected search key, and the results thereof are displayed as described with reference to FIGS. 9 through 14. Thus, when the results of the image search are displayed, as shown in (b) in FIG. 15, an operation for raising the imaging apparatus 100, an operation for tilting the imaging apparatus 100, an operation for shaking the imaging apparatus 100, and an operation for tapping the imaging apparatus 100 are detected as a predetermined operation for determining the search results.

In the case that these operations have been performed as to the imaging apparatus 100, the motion sensor 137 of the imaging apparatus 100 detects the motion of itself according to each of the operations thereof, and notifies the control unit 120 of the detection results thereof.

The control unit 120 can determine what kind operation has been performed as to the imaging apparatus 100 based on the detection output from the motion sensor 137. Subsequently, in the case of determining that one of the operations shown in (b) in FIG. 15, i.e., an operation for raising, tilting, shaking, or tapping has been performed, the control unit 120 determines the displayed search results.

That is to say, the control unit 120 determines the image files corresponding to the thumbnail images displayed so as to be collected on predetermined positions of the display screen 6G as the results of the image search, and holds these.

Specifically, in order to prevent the search results thereof from being eliminated, the control unit 120 temporarily stores and holds the search results thereof, for example, in the RAM 123 or EEPROM 124 or the like, and maintains the state thereof until distinct canceling processing is executed.

Subsequently, the control unit 120 executes predetermined processing with the image file group of the determined image search results as a processing target. For example, the control unit 120 executes processing for storing the image file group of the determined image search results in a predetermined image folder.

The storing processing as to this folder is executed by the control unit 120 controlling the writing/reading unit 134. Specifically, this storing processing is processing for recording, of the image files of the image file group obtained as a result of the image search, information for accessing each of the image files in a predetermined image folder formed on the recording medium 135.

In this case, the control unit 120 controls, for example, the display image forming unit 111 and the display processing unit 105 to display the imaginary image of an image folder arranged to store image files, such as shown in (c) in FIG. 15.

Subsequently, the control unit 120 executes processing for storing the image file group of the determined image search results in the predetermined image folder.

Thus, with the imaging apparatus 100 according to the present embodiment, after the image search has been executed, such as shown in (b) in FIG. 15, in the case that a simple operation such as raising, tilting, shaking, or tapping, predetermined processing can be executed.

In this case, the control unit 120 can execute predetermined processing with the image file group obtained as a result of the image search as a processing target.

Note that description has been made here regarding the processing wherein the image file group obtained as a result of the image search is determined and held, and is then stored in the predetermined image folder, but the present invention is not restricted to this.

For example, the image file group obtained as a result of the image search may be subjected to playback processing. This playback processing is processing wherein each piece of image data of the determined and held image file group is processed via the decompression processing unit 110, display image forming unit 111, and display processing unit 105 by the control of the control unit 120, and the playback image is displayed on the display screen 6G of the display unit 106.

Also, the image file group obtained as a result of the image search may also be transmitted to another imaging apparatus or the like, which will be described in detail later. This transmission processing is executed via the communication unit 141 controlled by the control unit 120.

In this case, an arrangement may be made wherein what kind of processing is executed as to the image file group obtained as a result of the image search has been set beforehand, and as described above, in the case that a predetermined operation has been executed as to the imaging apparatus 100, the set processing thereof is executed.

Also, separate processing may also be assigned to each operation of raising, tilting, shaking, and tapping to be executed as to the imaging apparatus 100.

For example, an operation for tilting the imaging apparatus 100 is assigned to the processing for storing the image file group obtained as a result of the image search in the folder. Also, an operation for shaking the imaging apparatus 100 is assigned to the playback processing of the image file group obtained as a result of the image search. Also, an operation for tapping the imaging apparatus 100 is assigned to the transmission processing for transmitting the image file group obtained as a result of the image search to another apparatus.

Thus, different processing may be executed according to an operation to be performed as to the imaging apparatus 100.

Details of Processing During Image Search

Next, description will be made regarding processing at the time of the image search to be executed at the imaging apparatus 100 according to the present embodiment. The processing at the time of the image search is a series of processes including, as also described above, setting of the search range, selection of a search key, display of the initial screen of the image search, image search processing, and the determining processing of the results of the image search.

Figure 16:
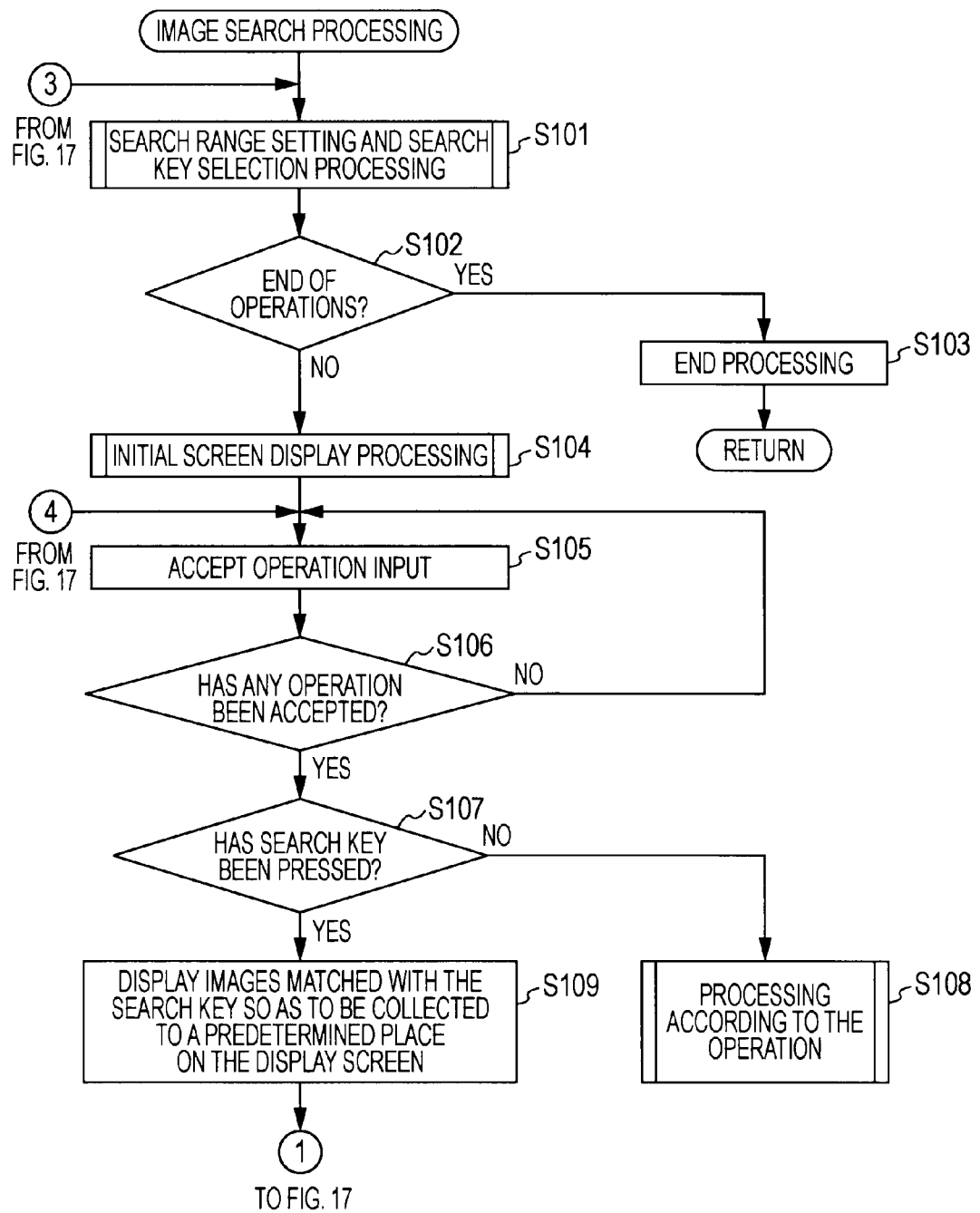
FIG. 16 is a flowchart for describing processing at the time of image search to be executed in the imaging apparatus.
Figure 17:
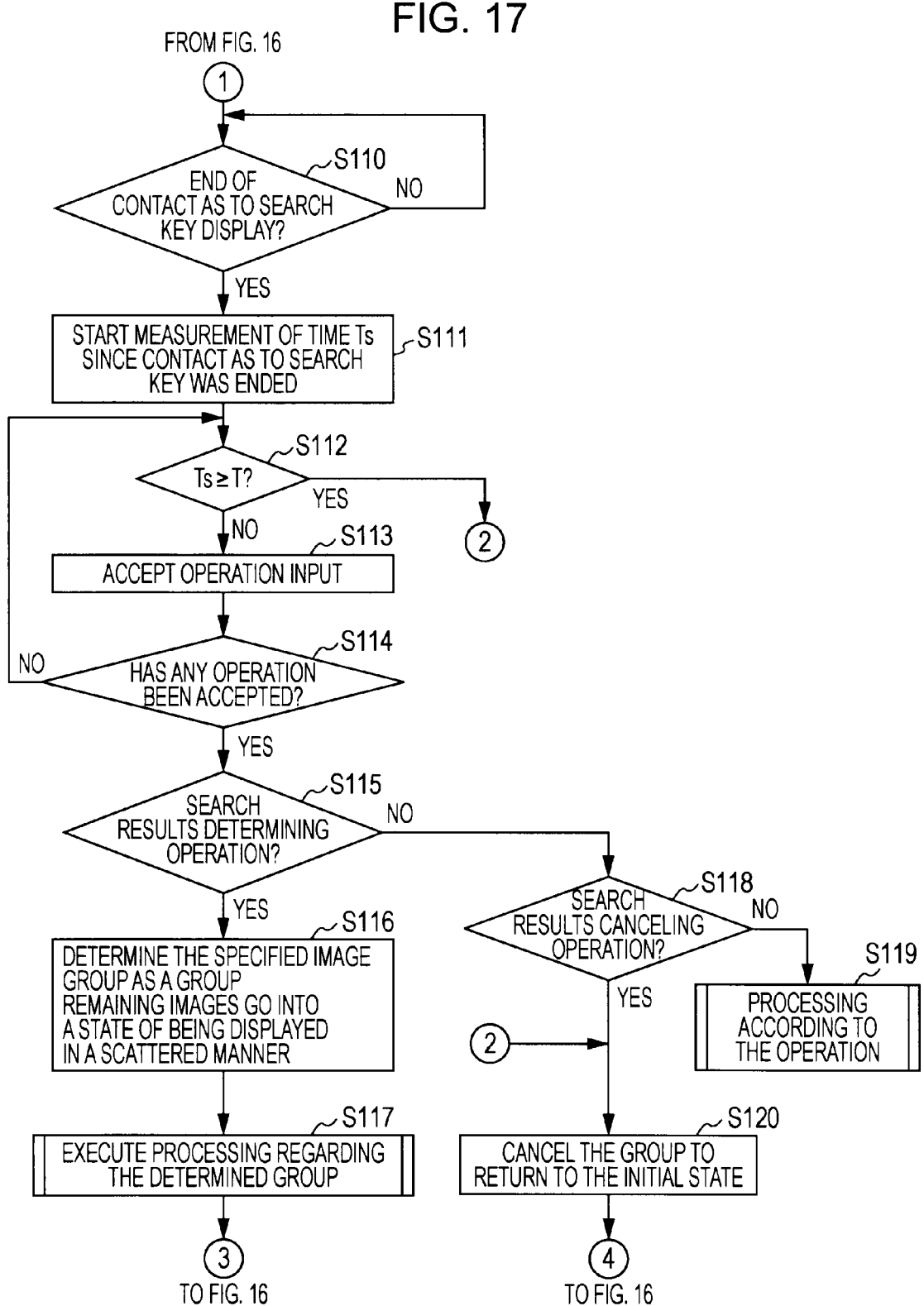
FIG. 17 is a flowchart continued from FIG. 16.

FIGS. 16 and 17 are a flowchart for describing the processing at the time of the image search to be executed at the imaging apparatus 100. The processing of the flowchart shown in FIGS. 16 and 17 is, as described above, processing principally executed by the control unit 120 in the case that the menu item "image search" has been selected from the displayed menu.

Upon the processing shown in FIGS. 16 and 17 being executed, the control unit 120 executes, as described with reference to FIGS. 5A through 7B, setting of the image search range, and the selection processing of a search key (step S101).

Subsequently, in the processing in step S101, the control unit 120 determines whether or not an end operation has been performed (step S102). When determination is made in the determining processing in step S102 that an end operation has been performed, the control unit 120 executes processing for ending the image search processing (step S103) to end the processing shown in FIGS. 16 and 17, and for example, returns to the menu display.

Also, when determination is made in the determining processing in step S102 that an end operation has not been performed, the control unit 120 determines that selection of a search key has been performed suitably, and executes the display processing of the initial screen for the image search (step S104).

In step S104, as described with reference to FIG. 8, a predetermined operation for displaying the initial screen for the image search is arranged to be accepted, and in the case that this operation has been accepted, the control unit 120 executes processing for displaying the initial screen for the image search, which will be described later in detail.

Subsequently, the control unit 120 accepts operation input from the user via the touch screen 108 or the like (step S105), and determines whether or not operation input has been accepted (step S106).

When determination is made in the determining processing in step S106 that operation input from the user has not been accepted, the control unit 120 repeats the processing from step S105 to wait for operation input from the user.

When determination is made in the determining processing in step S106 that operation input from the user has been accepted, the control unit 120 determines whether or not the search key display as to the selected search key has been specified by the user (step S107).

When determination is made in the determining processing in step S107 that the search key display as to the selected search key has not been specified by the user, the control unit 120 executes the processing corresponding to the operation input accepted in step S105 (step S108).

In step S108, the control unit 120 allows the user to perform various types of processing according to the operation input of the user. For example, the user is allowed to perform change of a search key, adding processing, and so forth.

Subsequently, when determination is made in the determining processing in step S107 that the search key display has been specified by the user, the control unit 120 executes the image search using the search key corresponding to the specified search key display to display the search results (step S109).

In step S109, the control unit 120 displays, as described with reference to FIGS. 9, 10, 11, and 14, the thumbnail images of the image files corresponding to the search key so as to be collected on a predetermined place, and proceeds to the processing in FIG. 17.

Subsequently, the control unit 120 determines whether or not contact of the finger or the like of the user as to the search key display has been completed (step S110). When determination is made in the determining processing in step S110 that contact has continued, the control unit 120 repeats the processing from step S110 to go into a wait state until contact ends.

When determination is made in the determining processing in step S110 that contact of the finger or the like of the user as to the search key display has been completed, the control unit 120 uses the function of the clock circuit to start measurement of time Ts since the end of contact of the user's finger as to the search key display (step S111). Though not shown in FIG. 1, this clock circuit is included in the imaging apparatus 100, as also described above.

Subsequently, the control unit 120 determines whether or not the time Ts of which the measurement has been started in step S111 is equal to or greater than a predetermined period of time T (step S112). When determination is made in the determining processing in step S112 that the measurement time Ts is smaller than the predetermined period of time T, the control unit 120 accepts operation input from the user (step S113).

Subsequently, the control unit 120 determines whether or not operation input from the user has been accepted (step S114). When determination is made in the determining processing in step S114 that operation input has not been accepted, the control unit 120 repeats the processing from step S112.

When determination is made in the determining processing in step S114 that operation input has been accepted, the control unit 120 determines whether or not the accepted operation input is a search results determining operation (step S115).

When determination is made in the determining processing in step S115 that the accepted operation input is a search results determining operation, the control unit 120 determines the specified image group as a group (step S116). This processing in step S116 is processing for maintaining the image file group as a result of the image search as it is.

After the processing in step S116, the control unit 120 executes predetermined processing regarding the images of the determined group, such as storing the images of the determined group in a predetermined image folder, playing of an image thereof, transmitting an image thereof to another apparatus, or the like (step S117). Subsequently, the control unit 120 repeats the processing from step S101 in FIG. 16, for example.

The processing in steps S115 through S117 is made up of the determining processing of the image search results described with reference to FIG. 15, and the processing for executing predetermined processing with the determined image file group as a processing target.

Also, when determination is made in the determining processing in step S115 that the accepted operation input is not a search result determining operation, the control unit 120 determines whether or not the accepted operation input is a search result canceling operation (step S118).

When determination is made in the determining processing in step S118 that the accepted operation input is not a search result canceling operation, the control unit 120 executes the processing corresponding to the accepted operation input (step S119).

Also, when determination is made in the determining processing in step S118 that the accepted operation input is a search result canceling operation, for example, the control unit 120 cancels display of the image search results, and returns to the initial state of the image search (step S120).

After the processing in step S120, the control unit 120 repeats the processing from step S105 in FIG. 16, whereby the user is allowed to perform the image search corresponding to the displayed search key display, or to perform the image search by adding a new search key.

Also, when determination is made in the determining processing in step S112 that the measurement time Ts is equal to or greater than the predetermined period of time T, the control unit 120 cancels display of the image search results, and returns to the initial state of the image search (step S120).

Subsequently, as also described above, the control unit 120 repeats the processing from step S105 in FIG. 16.

Thus, with the imaging apparatus 100 according to the present embodiment, after setting an image search range, and selecting a search key, the user can be allowed to display the initial screen for the image search with a simple operation to execute the image search.

Further, after executing the image search, the user can be allowed to determine the image file group obtained as a result of the image search with a simple operation, and to execute predetermined processing such as storing in the folder, playing, or transmission to another apparatus with the determined image file group as a processing target.

Note that determining of the image file group obtained as a result of the image search unit, as also described above, holding of the image search results without canceling the image search results. Predetermined processing is executed as also described above with the image file group obtained as a result of the image search thus determined as a processing target.

Also, with regard to canceling of display of the image search results, after the operation for specifying the search key has been canceled, in the case that a determining operation has not been performed until a certain period of time elapses, display of the image search results can be canceled automatically without being canceled by the user each time.

Thus, the user can be allowed to execute the image search using the next search key without performing an operation for canceling display of the image search results each time.

Initial Screen Display Processing

Figure 18:
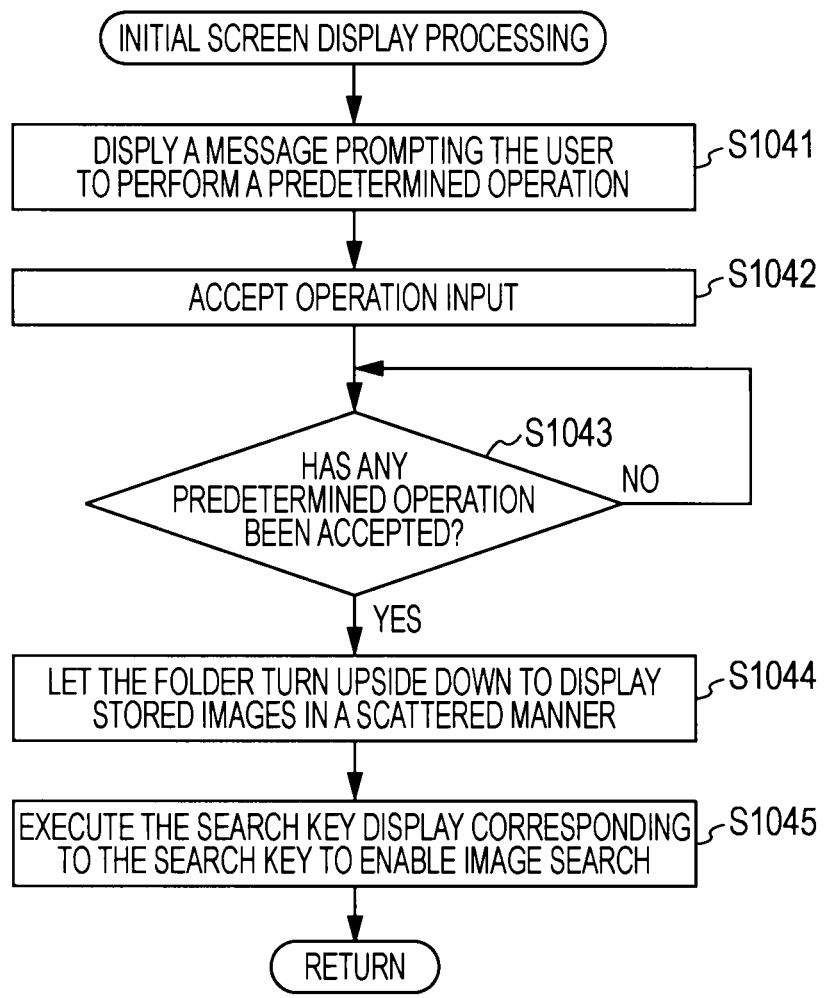
FIG. 18 is a flowchart for describing initial screen display processing of image search to be executed in step S104 shown in FIG. 16.

Next, description will be made specifically regarding image search initial screen display processing to be executed in step S104 of the image search processing described with reference to FIGS. 16 and 17. FIG. 18 is a flowchart for describing the image search initial screen display processing to be executed in step S104 shown in FIG. 16.

First, the control unit 120 controls the display image forming unit 111 and the display processing unit 105 to form a message for prompting the user to perform a predetermined operation for displaying the initial screen of the image search, and to display this on the display screen 6G of the display unit 106 (step S1041).

Here, the predetermined operation for displaying the initial screen of the image search is, as described with reference to (b) in FIG. 8, one of the laying over operation, tilting operation, shaking operation, and tapping operation, as to the imaging apparatus 100.

Subsequently, the control unit 120 accepts an operation (motion) as to the imaging apparatus 100 from the user (step S1042), and determines whether or not the predetermined operation for displaying the initial screen of the image search has been performed (step S1043).

With regard to the determining processing in step S1043, the control unit 120 can determine based on the detection output from the motion sensor 137. Note that the control unit 120 may be configured so as to determine whether or not the imaging apparatus 100 has been tapped, based on the detection output from the touch panel 1036 on the set upper portion 136.

When determination is made in the determining processing in step S1043 that the predetermined operation for displaying the initial screen of the image search has not been performed, the control unit 120 repeats the processing from step S1043, and goes into a waiting state until this predetermined operation is performed.

When determination is made in the determining processing in step S1043 that the predetermined operation for displaying the initial screen of the image search has been performed, the control unit 120 displays the thumbnail images of the image files within the search range on the display screen 6G in a scattered manner (step S1044).

This processing in step S1044 is processing for displaying the thumbnail images of the image files within the search range set by the processing in step S101 shown in FIG. 16 on the display screen 6G in a scattered manner.

That is to say, the processing in step S1044 is processing to be executed by the control unit 120 controlling the decompression processing 110, display image forming unit 111, and display processing unit 105 in the same way as the above processing for displaying the thumbnail images.

Specifically, in step S1044 the control unit 120 controls the above units to form thumbnail data from the image data of the image files belonging to the search range, and displays this on the display screen 6G at random.

Subsequently, the control unit 120 controls the display image forming unit 111 and the display processing unit 105 to display the search key display (search key icon) corresponding to the search key selected in step S101 on the display screen 6G, allows the user to perform the image search (step S1045), and ends this processing shown in FIG. 18.

Thus, with the imaging apparatus 100 according to the present embodiment, after setting the search range of images, and selecting a search key, the user can be allowed to display the initial screen of the image search by a simple operation such as laying over, tilting, shaking, or tapping the imaging apparatus 100, i.e., the user can be allowed to make preparations for the image search by a very simple operation.

Also, the user can be allowed to determine the image file group obtained as a result of the image search by the same simple operation as the operation for displaying the initial screen of the image search to execute predetermined processing with the determined image file group thereof as a processing target.

Note that the processing for determining the image file group obtained as a result of the image search, and subjecting this to predetermined processing is executed principally in steps S115 through S117 of the processing shown in FIGS. 16 and 17.

Transmission of Image File Group to Another Apparatus

As described above, with the imaging apparatus 100 according to the present embodiment, description has been made wherein the user performs the image search using the search key selected by the user, determines the image file group obtained as a result thereof, and predetermined processing is executed with the determined image file group thereof as a processing target.

Here, the predetermined processing is, as also described above, the storing processing of an image file group in an image folder, playback processing of an image file group, transmission processing of an image file group to another apparatus, or the like.

The storing processing as to an image folder is, as also described above, processing closed in the imaging apparatus 100. Specifically, in order to let the determined image file group belong to a predetermined image folder, according to the control of the control unit 120, information for accessing each image file of this image file group should be written additionally to information possessed by this image folder.

Also, the playback processing of an image folder group is also processing closed in the imaging apparatus 100. Specifically, in this case, the control unit 120 should control the decompression processing unit 110, display image forming unit 111, and display processing unit 105 to play the image corresponding to each piece of image data of the determined image file group, and to display this on the display screen 6G of the display unit 106.

On the other hand, the processing for transmitting an image file group to another apparatus involves communication with the other apparatus, and accordingly, includes a portion somewhat different from processing for storing an image file folder in an image folder, or playing this.

Description will be made below regarding a case where the imaging apparatus 100 according to the present embodiment transmits the image file group obtained as a result of the image search to another imaging apparatus (another apparatus) configured in the same way. FIGS. 19A through 22 are diagrams for describing a case where the image file group obtained as a result of the image search is transmitted to another imaging apparatus (another apparatus) configured in the same way.

In the case that the results of the image search have been displayed on the display screen 6G, in the event that the following operation has been performed as to the imaging apparatus 100, determination is made that it has been instructed to transmit the image file group obtained as a result of the image search to another imaging apparatus (another apparatus) configured in the same way.

That is to say, in the case that the imaging apparatus 100 has been tilted such as shown in FIG. 19A, in the case that the imaging apparatus 100 has been shaken left and right such as shown in FIG. 19B, or in the case that the upper portion of the imaging apparatus 100 has been tapped such as shown in FIG. 19C, determination is made that this operation is determined to be a transmission instruction to another apparatus.

Subsequently, the imaging apparatus 100 which has accepted a transmission instruction to another apparatus executes communication with the transmission destination apparatus, establishes communication connection, and then transmits the image file group obtained as a result of the image search to this transmission destination apparatus.

On the other hand, the transmission destination apparatus receives the image file group from the transmission source imaging apparatus 100, and executes processing for storing this in a predetermined image folder of a recording medium of the imaging apparatus 100.

Note that the transmission destination imaging apparatus 100 executes display indicating that data is being transmitted in the middle of transmission of the image file group. Also, the transmission destination apparatus executes display indicating that data is being received in the middle of reception of the image file group.

Let us consider a case where, such as shown in FIGS. 20 and 21, transmission/reception of data is executed between an imaging apparatus 100(S) and an imaging apparatus 100(R) which have the configuration described with reference to FIG. 1.

Let us say that the transmission source imaging apparatus 100(S) in a state in which the image file group obtained as a result of the image search (the thumbnail images of the image files) are displayed on the display screen 6G is tilted such as shown in (a) in FIG. 20. In this case, the transmission source imaging apparatus 100(S) executes communication mutually with the transmission destination imaging apparatus 100(R) to establish communication connection.

Subsequently, the transmission source imaging apparatus 100(S) transmits the image file group as a result of the image search. On the other hand, the transmission destination imaging apparatus 100(R) executes processing for receiving the transmitted image file group, and storing this in a recording medium.

In this case, as shown in the upper portion of (a) through (c) in FIG. 20, in accordance with the transmission state of the image file group as a result of the image search that is a transmission target, the transmission source imaging apparatus 100(S) changes the display of this image file group to indicate that data is being transmitted.

On the other hand, as shown in the lower portion of (a) through (c) in FIG. 20, in accordance with the reception state of the image file group, the transmission destination imaging apparatus 100(R) changes the display of the received image file group to indicate that data is being received.

Also, such as shown in (a) in FIG. 21, let us say that the transmission source imaging apparatus 100(S) in a state in which the image file group obtained as a result of the image search (the thumbnail images of the image files) is displayed on the display screen 6G is shaken left and right, for example.

In this case as well, in the same way as with case described with reference to FIG. 20, the transmission source imaging apparatus 100(S) executes communication mutually with the transmission destination imaging apparatus 100(R) to establish communication connection.

Subsequently, the transmission source imaging apparatus 100(S) transmits the image file group as a result of the image search. On the other hand, the transmission destination imaging apparatus 100(R) executes processing for receiving the transmitted image file group, and storing this in a recording medium.

Subsequently, as shown in the upper portion of (a) through (c) in FIG. 21, in accordance with the transmission state of the image file group as a result of the image search that is a transmission target, the transmission source imaging apparatus 100(S) changes the display of this image file group to indicate that data is being transmitted.

On the other hand, as shown in the lower portion of (a) through (c) in FIG. 21, in accordance with the reception state of the image file group, the transmission destination imaging apparatus 100(R) changes the display of the received image file group to indicate that data is being received.

Also, such as shown in (a) in FIG. 22, let us say that the transmission source imaging apparatus 100(S) in a state in which the image file group obtained as a result of the image search (the thumbnail images of the image files) is displayed on the display screen 6G is tapped on the upper face thereof, for example.

In this case as well, in the same way as with case described with reference to FIGS. 20 and 21, the transmission source imaging apparatus 100(S) executes communication mutually with the transmission destination imaging apparatus 100(R) to establish communication connection.

Subsequently, the transmission source imaging apparatus 100(S) transmits the image file group as a result of the image search. On the other hand, the transmission destination imaging apparatus 100(R) executes processing for receiving the transmitted image file group, and storing this in a recording medium.

Subsequently, as shown in the upper portion of (a) through (c) in FIG. 22, in accordance with the transmission state of the image file group as a result of the image search that is a transmission target, the transmission source imaging apparatus 100(S) changes the display of this image file group to indicate that data is being transmitted.

On the other hand, as shown in the lower portion of (a) through (c) in FIG. 22, in accordance with the reception state of the image file group, the transmission destination imaging apparatus 100(R) changes the display of the received image file group to indicate that data is being received.

Thus, in a state the thumbnail images of the image files obtained as a result of the image search have been displayed, in the case that a predetermined operation has been performed, the imaging apparatus 100 according to the present embodiment executes communication with a partner apparatus to transmit the image file group to the partner destination.

Description will be made below regarding the details of the above data transmission processing of the transmission source imaging apparatus 100(S), and the above data reception processing of the transmission destination imaging apparatus 100(R).

Data Transmission Processing of Transmission Source Imaging Apparatus 100(S)

FIG. 23 is a flowchart for describing the data transmission processing to be executed at the imaging apparatus 100(S) for transmitting the image file group obtained as a result of the image search. The processing shown in FIG. 23 is processing to be executed in step S117 of the processing described with reference to FIGS. 16 and 17.

That is to say, as described with reference to FIGS. 16 and 17, let us say that after setting the search range of images, and selecting a search key, the user has performed the image search using the selected search key, and the results of the image search thereof are displayed on the display screen 6G.

In this case, as described with reference to FIG. 17, the control unit 120 accepts operation input from the user (step S113), and determines whether or not an operation has been performed, based on the detection output from the motion sensor 137 (step S114).

When determination is made in step S114 that an operation has been performed, the control unit 120 determines whether or not this accepted operation input is the predetermined operation such as tilting, shaking left and right, tapping the set upper portion, as to the imaging apparatus 100 (step S115).

When determination is made in the determining processing in step S115 that the predetermined operation such as tilting, shaking left and right, tapping on the set upper portion, as to the imaging apparatus 100, has been performed, the image file group obtained as a result of the image search are determined to be the search results (step S116).

Subsequently, in step S117 shown in FIG. 17, the data transmission processing shown in FIG. 23 is executed. In this case, the control unit 120 of the transmission source imaging apparatus 100(S) forms a data reception request, and transmits this to the imaging apparatus 100(R) which is a transmission destination with this example, via the communication unit 141 and the transmission/reception antenna 142 (step S201). This reception request includes the identification ID of the request source imaging apparatus 100(S).

Subsequently, the control unit 120 executes response reception processing so as to receive a response as to the reception request transmitted in step S201 (step S202). With this processing in step S202, any response is returned from the request source, or in the case that no response has been received within a predetermined period of time, the processing thereof is ended. After the response reception processing in step S202, the control unit 120 determines whether or not a receivable response has been received from the transmission destination imaging apparatus 100(R) (step S203).

When determination is made in the determining processing in step S203 that no receivable response has been received, the control unit 120 ends the processing shown in FIG. 23, returns the processing in step S117 in FIG. 17, and repeats the processing from step S101 in FIG. 16.

When determination is made in the determining processing in step S203 that a receivable response has been received, the control unit 120 starts transmission of the image file group obtained as a result of the image search to the imaging apparatus 100(R) via the communication unit 141 and the transmission/reception antenna 142 (step S204).

That is to say, the identification ID of the transmission destination imaging apparatus 100(R) is also added to the receivable response. Therefore, in step S204 the control unit 120 forms transmission data to the imaging apparatus 100(R) to which the identification ID of the transmission destination imaging apparatus 100(R) has been added, and starts processing for transmitting this to the imaging apparatus 100(R).

Subsequently, the control unit 120 changes, as shown in the upper portion of FIGS. 20, 21, and 22, the display state of the image file group obtained as a result of the image search according to the transmission situation of the image file group.

Specifically, the control unit 120 controls the display image forming unit 111 and the display processing unit 105 to execute processing for reducing the number of displays of the thumbnail images to be displayed according to the transmission quantity, and also displaying the thumbnail images so as to gradually move the display positions of the thumbnail images to the edge portion of the display screen.

Subsequently, the control unit 120 determines whether or not all of the image file groups to be transmitted have been transmitted (step S206). When determination is made in the determining processing in step S206 that all have been transmitted, the control unit 120 forms an image file transmission completion command, and transmits this to the transmission destination imaging apparatus 100(R) via the communication unit 141 and the transmission/reception antenna 142 (step S208).

After the processing in step S208, the control unit 120 ends the processing shown in FIG. 23, returns to the processing in step S117 in FIG. 17, and repeats the processing from step S101 in FIG. 16.

Also, when determination is made in the determining processing in step S206 that all have not been transmitted, the control unit 120 determines whether or not an end operation, such as pressing of the end key or the like, has been performed (step S207).

When determination is made in the determining processing in step S207 that no end operation has been performed, the control unit 120 repeats the processing from step S205 to continue transmission of image file groups.

When determination is made in the determining processing in step S207 that an end operation has been performed, the control unit 120 forms an image file transmission completion command, and transmits this to the transmission destination imaging apparatus 100(R) via the communication unit 141 and the transmission/reception antenna 142 (step S208).

After this processing in step S208, as also described above, the control unit 120 ends the processing shown in FIG. 23, returns to the processing in step S117 in FIG. 17, and repeats the processing from step S101 in FIG. 16.

Thus, with the transmission source imaging apparatus 100(S), the image file group obtained as a result of the image search can be transmitted to the communication partner destination only by performing a simple operation such as tilting, shaking, or tapping the imaging apparatus 100(S).

Data Reception Processing of Transmission Destination Imaging Apparatus 100(R)

Figure 24:
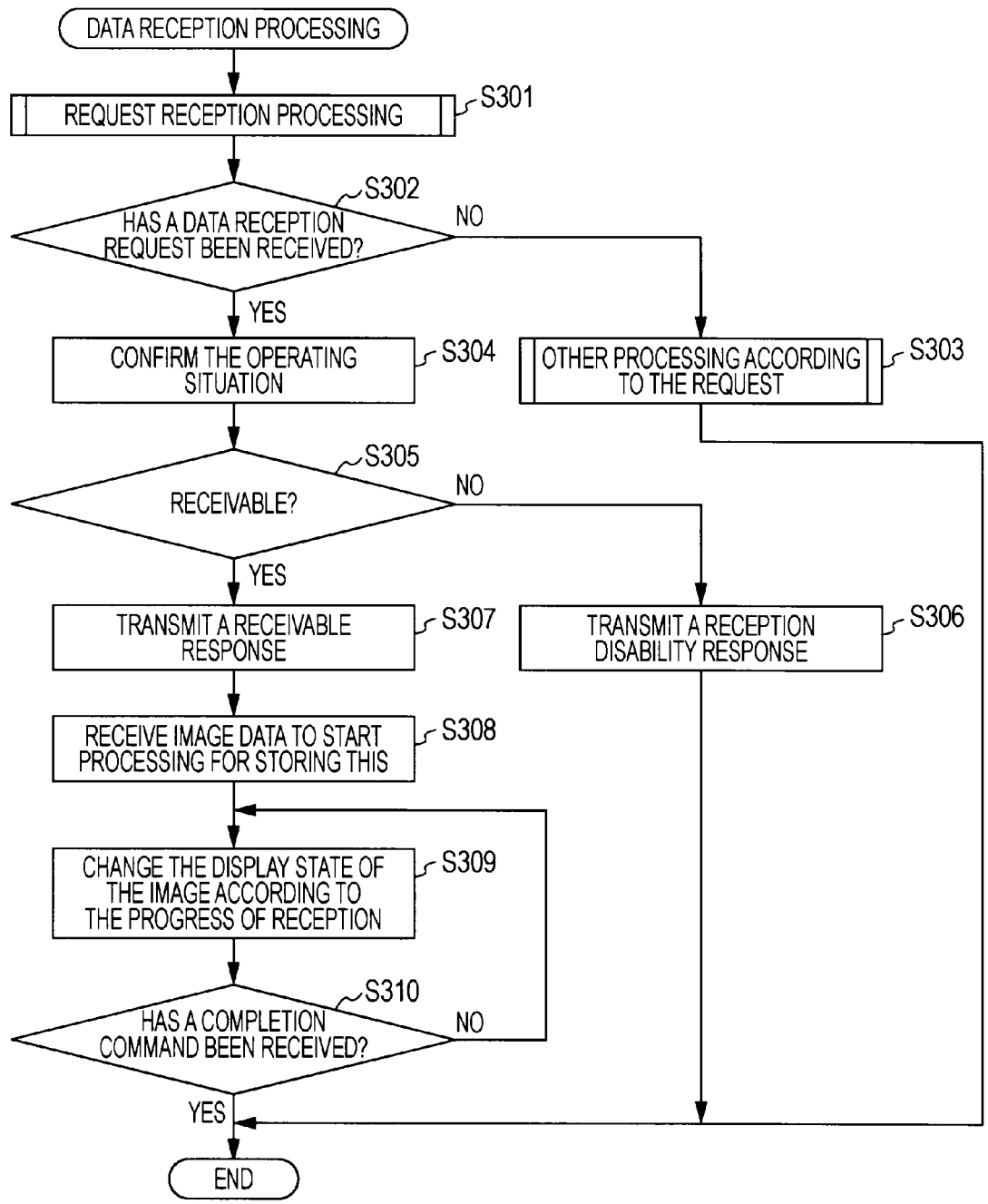
FIG. 24 is a flowchart for describing data reception processing to be executed at the imaging apparatus for receiving an image file group.

FIG. 24 is a flowchart for describing the data reception processing to be executed at the imaging apparatus 100(R) for receiving the image file group transmitted from the transmission source imaging apparatus 100(S). The processing shown in FIG. 24 is processing to be executed principally at the control unit 120 of the imaging apparatus 100(R), for example, in the case that the imaging apparatus 100(R) is set to a data reception mode.

Note that the imaging apparatus 100 includes an operation mode such as a taking mode for taking an image, a playback mode for playing an image file recorded in the recording medium 135, a data reception mode for executing reception of data addressed to the imaging apparatus 100 by short-distance communication, and so forth. The operation mode can be changed by selecting a desired operation mode through a menu, for example.

Subsequently, as described above, upon a predetermined operation being performed to set the operation mode to the data reception mode, the control unit 120 executes the processing shown in FIG. 24, first executes request reception processing for receiving various requests addressed to the imaging apparatus 100 (step S301). This processing in step S301 is processing to be executed until any request addressed to the imaging apparatus 100 is received.

With this processing in step S301, in the case that a request addressed to the imaging apparatus 100 has been received, the control unit 120 determines whether or not the received request addressed to the imaging apparatus 100 is a data reception request (step S302). When determination is made in the determining processing in step S302 that the received request is not a data reception request, the control unit 120 executes the processing corresponding to the received request thereof (step S303), and then ends the processing shown in FIG. 24.

Also, when determination is made in the determining processing in step S302 that the received request is a data reception request, the control unit 120 confirms the operation situation of the imaging apparatus 100 (step S304). In step S304, the control unit 120 confirms, for example, the battery remaining quantity, the amount of space of the recording medium 135, and besides, whether or not there is a portion in a situation disturbing the reception processing of data, and so forth.

Subsequently, the control unit 120 determines whether or not the imaging apparatus 100 is in a state capable of receiving data, based on the operation situation of the imaging apparatus 100 confirmed in step S304 (step S305).

When determination is made in the determining processing in step S305 that the imaging apparatus 100 is not in a state capable of receiving data, the control unit 120 forms a reception disability response, and transmits this to the transmission source imaging apparatus 100(S) via the communication unit 141 and the transmission/reception antenna 142 (step S306). Subsequently, the control unit 120 ends the processing shown in FIG. 24.

Also, when determination is made in the determining processing in step S305 that the imaging apparatus 100 is in a state capable of receiving data, the control unit 120 forms a receivable response, and transmits this to the transmission source imaging apparatus 100(S) via the communication unit 141 and the transmission/reception antenna 142 (step S307).

That is to say, the reception request from the imaging apparatus 100(S) is added with the identification ID of this imaging apparatus 100(S). Therefore, the transmission destination imaging apparatus 100(R) forms a receivable response including the identification ID of the transmission source imaging apparatus 100(S) and the identification ID of the imaging apparatus 100, and transmits this to the transmission destination imaging apparatus 100.

Subsequently, the control unit 120 controls the communication unit 141 to start processing for receiving the image data of the image file group addressed to the imaging apparatus 100 transmitted from the transmission source imaging apparatus 100(S), and storing this in the recording medium 135 (step S308).

Subsequently, such as shown in the lower portion of FIGS. 20, 21, and 22, the control unit 120 changes the display state of the display image indicating the reception situation to be displayed on the display screen 6G of the display unit 106, according to the reception situation of the image file groups (step S309).

Specifically, the control unit 120 controls the display image forming unit 111 and the display processing unit 105 to execute processing for increasing the number of displays of the thumbnail images to be displayed according to the reception quantity of image data, and also displaying the thumbnail images so as to gradually move the display positions of the thumbnail images to the center of the display screen.

Subsequently, the control unit 120 determines whether or not a completion command has been transmitted from the transmission source imaging apparatus 100(S) (step S310). When determination is made in the determining processing in step S310 that no completion command has been transmitted, the control unit 120 repeats the processing from step S309 to continue the reception processing of image data from the transmission source imaging apparatus 100(S).

When determination is made in the determining processing in step S310 that a completion command has been transmitted, transmission of image data from the transmission source has been completed, and accordingly, the control unit 120 ends the processing shown in FIG. 24.

Thus, the transmission destination imaging apparatus 100(R) sequentially can receive the image data transmitted from the transmission source imaging apparatus 100(S) to store this in the recording medium 135 of the imaging apparatus 100.

Thus, with the imaging apparatus 100 according to the present embodiment, the image data obtained as a result of the image search can be not only stored in the recording medium at the imaging apparatus 100 or played but also transmitted to another apparatus by a simple operation. Note that, here, the operations for tilting, shaking right and left, and tapping on the set upper portion, as to the imaging apparatus 100(S) have been determined to be an operation for executing transmission of image data, but the present invention is not restricted to this. An operation for shaking vertically, or an operation for tapping on the side face of the imaging apparatus 100(S) may also be determined to be an operation for executing transmission of image data.

Also, an arrangement may be made wherein of the three operations of tilting, shaking, and tapping the imaging apparatus 100(S), one of these is assigned to an instructing operation for executing the transmission processing of image data, and the other operations are assigned to another processing.

Also, description has been made here regarding the case where image data is transmitted from the transmission source imaging apparatus 100(S) to the transmission destination imaging apparatus 100(R) which are configured in the same way, as an example, but the present invention is not restricted to this.

Image data may be transmitted to various electronic apparatuses capable of communication via the communication unit 141 and the transmission/reception antenna 142 of the transmission destination imaging apparatus 100(S). For example, an arrangement may be made wherein communication is executed between the imaging apparatus 100(S) and a communicable hard disk device, and image data is backed up in this hard disk device in a simple operation.

Also, with the above embodiment, description has been made wherein the transmission source imaging apparatus 100(S) and a partner destination apparatus execute communication wirelessly, but the present invention is not restricted to this. That is to say, it goes without saying that transmission/reception of data may be executed with a partner destination apparatus connected thereto by cable. In this case, for example, communication should be executed via the external interface 132 and the input/output terminal 133.

Advantages

According to an extremely simple operation as to the imaging apparatus 100 such as laying over, raising, tilting, shaking, or tapping the imaging apparatus 100, the initial screen of the image search can be displayed, and processing with the image file group obtained as a result of the image search as a processing target can be executed.

That is to say, processing to be executed all the time, processing to be executed frequently, or processing to be executed in a sure manner can be executed in a sure manner without performing a complicated operation.

Also, a simple operation from the user is accepted based on the detection output from the motion sensor 137 or the touch panel 136 on the set upper portion or the like, and according to this operation, desired processing, e.g., data transmission processing and the like can also be executed.

Also, in the case that image data is passed to another apparatus, the process thereof is provided to the user in a manner correlated with a method in the real world, such that an object is passed, and this is received, whereby feedback that the user can readily understand can be provided.

Method and Program of Present Invention

Note that, such as is apparent from the above embodiment, the method and program of the present invention can be realized principally as a method and program described with reference to the flowchart shown in FIGS. 16, 17, 18, and 23.

That is to say, the method described with reference to FIGS. 16, 17, 18, and 23 is an embodiment according to the method of the present invention.

The program for executing the processing described with reference to FIGS. 16, 17, 18, and 23 is an embodiment according to the program of the present invention.

Accordingly, the program according to the present invention is realized, and is implemented into a digital still camera or various types of image processing apparatus, whereby the image processing apparatus according to the present invention can be realized.

Others

Note that, with the above embodiment, the control unit 120 realizes each of the determining unit and the processing control unit. Also, the motion sensor 137 and the touch panel 136 on the set upper portion realize the motion detecting unit.

Also, the control unit 120 serving as a holding unit, and a playback system made up of the writing/reading unit 134 serving as a playback unit, decompression processing unit 110, display image forming unit 111, and display unit 106 realize the processing unit. Further, the writing/reading unit 134 serving as a recording unit, and the communication unit 141 serving as a transmission unit realize the processing unit.

Also, with the above embodiment, the display unit 106 collaborates with the touch panel 107 to realize the search key specifying unit, but the present invention is not restricted to this. The search key specifying unit can also be realized with a hardware key provided to the operating unit 131, for example.

Specifically, after specifying a search key to be used for the image search, in the case that a predetermined hardware key for executing the image search using this search key is pressed and operated, the image search using this search key can be executed.

In this case, in the event of using two or more search keys, multiple predetermined hardware keys for executing the image search are provided corresponding thereto, whereby the image search can be executed in the same way as with the case using the touch panel.

Also, these hardware keys are provided, for example, as two slidable hardware keys, whereby the image search using two search keys can be executed as described with the above embodiment.

Also, with the above embodiment, image files having a degree of association in three stages of a high degree of association, a medium degree of association, and a low degree of association as to the search keys have been searched, but the present invention is not restricted to this. It goes without saying that a degree of association may be further divided more finely.

Also, with the above embodiment, a case where the present invention has been applied to the imaging apparatus has been described as an example, but the present invention is not restricted to this. For example, the present invention may be applied to cellular phone terminals, portable information terminals called PDAs (Personal Digital Assistant) or the like capable of image data processing, and various image processing apparatuses capable of other image data processing.

Also, image data to be displayed is not restricted to the image data of a still image. For example, the present invention may be applied to image processing apparatuses wherein the representative images or thumbnail images of multiple moving picture contents stored in a recording medium are taken as display objects.

Also, with the above embodiment, the touch panel 107 included in the imaging apparatus 100 has been described as a panel capable of detecting the user's finger or the like, but the present invention is not restricted to this. For example, in the case of the user bringing the finger or the like close to the operating surface to an extent without contacting the operating surface this can be used for realizing the present invention, as long as the position brought close is detectable.

That is to say, the touch panel 107 is not restricted to a contact type. For example, a non-contact type touch panel may be used wherein in the case that the finger or the like is brought close to an extent, change in the potential on the operating surface, or change in brightness at the position brought close is detected, and this changed position on the operation surface can be determined as a specified position.

Also, with the above embodiment, as shown in FIGS. 9 and 10 and the like, the display positions and display directions and the like of thumbnail images to be displayed have been displayed in a scattered manner (at random), but the present invention is not restricted to this.

The display direction may be fixed. That is to say, in the case of having executed the image search, there is a feature in that the thumbnail images of images matched with the search key are displayed so as to be gathered together at predetermined positions on the display screen, and other portions can be displayed in various modes.

Also, as also described above, thumbnail data is formed from image data beforehand, this is added to each image file, and accordingly, thumbnail data does not have to be formed at the time of display of the thumbnail images, and accordingly, the load on the apparatus can be reduced.

The present application contains subject matter related to that disclosed in Japanese Priority Patent Application JP 2008-318001 filed in the Japan Patent Office on Dec. 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
circuitry configured to:
determine one or more pieces of image data to be processed;
detect a motion of said image processing apparatus; and
perform processing control so as to execute a predetermined processing based on detecting, via said motion detecting, that a predetermined operation has been executed with respect to said image processing apparatus,
wherein the predetermined processing includes executing an image search using at least one user-specified image as a search key, and
wherein said processing control includes graphically representing transmission of said one or more pieces of image data to another apparatus by depicting a decrease in a remaining number of said one or more pieces of image data to be transmitted along with a corresponding increase in a received number of said one or more pieces of image data that have been received.

2. The image processing apparatus according to claim 1, wherein the predetermined operation detected via said motion detecting corresponds to at least one of laying over or raising said image processing apparatus, shaking said image processing apparatus, and tapping said image processing apparatus.

3. The image processing apparatus according to claim 1, wherein said processing control includes storing said one or more pieces of image data in a storage.

4. The image processing apparatus according to claim 1, wherein said processing control includes executing playback of said one or more pieces of image data.

5. The image processing apparatus according to claim 1, wherein said processing control includes executing recording of said one or more pieces of image data in a predetermined storage destination.

6. The image processing apparatus according to claim 1, wherein said processing control includes determining a face area of at least one person in a user-specified image and extracting image files including the at least one person, each of the extracted image files having a corresponding face area, area differences between the face area and the corresponding face areas each being specified by one of at least three predetermined ranges, each of which is associated with a corresponding predetermined degree of association.

7. The image processing apparatus according to claim 1, wherein a user specifies the at least one user-specified image using a touch panel of the image processing apparatus.

8. The image processing apparatus according to claim 1, wherein the processing control further includes reading image analysis information associated with the at least one user-specified image and extracts the image files, which have the same image analysis information.

9. The image processing apparatus according to claim 1, wherein the processing control further includes reading image analysis information associated with the at least one user-specified image and extracts the image files, which have image analysis information that is within a predetermined degree of similarity.

10. An image processing method for operating an image processing apparatus comprising the steps of:
determining one or more pieces of image data to be processed;
detecting, via motion detecting circuitry in said image processing apparatus, a motion of said image processing apparatus; and
controlling execution of a predetermined processing regarding said one or more pieces of image data determined via said determining based on detecting that a predetermined operation has been executed with respect to said image processing apparatus in said detecting,
wherein the predetermined processing includes executing an image search using at least one user-specified image as a search key, and
wherein said controlling execution includes graphically representing transmission of said one or more pieces of image data to another apparatus by depicting a decrease in a remaining number of said one or more pieces of image data to be transmitted along with a corresponding increase in a received number of said one or more pieces of image data that have been received.

11. The image processing method according to claim 10, wherein said predetermined processing includes determining a face area of at least one person in a user-specified image and extracting image files including the at least one person, each of the extracted image files having a corresponding face area, area differences between the face area and the corresponding face areas each being specified by one of at least three predetermined ranges, each of which is associated with a corresponding predetermined degree of association.

12. A non-transitory computer-readable storage medium having computer readable program codes embodied in the computer readable storage medium that, when executed cause a computer implemented in an image processing apparatus to execute:
determining one or more pieces of image data to be processed;
detecting a motion of said image processing apparatus; and
controlling execution of a predetermined processing regarding said one or more pieces of image data determined via said determining based on detecting that a predetermined operation has been executed with respect to said image processing apparatus in said detecting,
wherein the predetermined processing includes executing an image search using at least one user-specified image as a search key, and
wherein said controlling execution includes graphically representing transmission of said one or more pieces of image data to another apparatus by depicting a decrease in a remaining number of said one or more pieces of image data to be transmitted along with a corresponding increase in a received number of said one or more pieces of image data that have been received.

13. The non-transitory computer-readable storage medium according to claim 12, wherein said predetermined processing includes determining a face area of at least one person in a user-specified image and extracting image files including the at least one person, each of the extracted image files having a corresponding face area, area differences between the face area and the corresponding face areas each being specified by one of at least three predetermined ranges, each of which is associated with a corresponding predetermined degree of association.

14. An image processing apparatus comprising:
a determining unit configured to determine one or more pieces of image data to be processed;
a motion detecting unit configured to detect a motion of said image processing apparatus; and
a processing control unit configured to control execution of a predetermined processing based on detecting, via said motion detecting unit, that a predetermined operation has been executed with respect to said image processing apparatus, wherein the predetermined processing includes executing an image search using at least one user-specified image as a search key, and
wherein said processing control unit graphically represents transmission of said one or more pieces of image data to another apparatus by depicting a decrease in a remaining number of said one or more pieces of image data to be transmitted along with a corresponding increase in a received number of said one or more pieces of image data that have been received.

15. The image processing apparatus according to claim 14, wherein said processing control includes determining a face area of at least one person in a user-specified image and extracting image files including the at least one person, each of the extracted image files having a corresponding face area, area differences between the face area and the corresponding face areas each being specified by one of at least three predetermined ranges, each of which is associated with a corresponding predetermined degree of association.

16. An image processing method comprising the steps of:
determining of, with a determining unit of an image processing apparatus, one or more pieces of image data to be processed;
detecting of, with a motion detecting unit of the image processing apparatus, a motion of said image processing apparatus; and
controlling execution of a predetermined processing regarding said one or more pieces of image data determined via said determining based on detecting that a predetermined operation has been executed with respect to said image processing apparatus in said detecting,
wherein the predetermined processing includes executing an image search using at least one user-specified image as a search key, and
wherein said controlling execution includes graphically representing transmission of said one or more pieces of image data to another apparatus by depicting a decrease in a remaining number of said one or more pieces of image data to be transmitted along with a corresponding increase in a received number of said one or more pieces of image data that have been received.

17. The image processing method according to claim 16, wherein said predetermined processing includes determining a face area of at least one person in a user-specified image and extracting image files including the at least one person, each of the extracted image files having a corresponding face area, area differences between the face area and the corresponding face areas each being specified by one of at least three predetermined ranges, each of which is associated with a corresponding predetermined degree of association.

18. A non-transitory computer-readable storage medium having computer readable program codes embodied in the computer readable storage medium that, when executed cause an image processing apparatus to execute:
determining, with a determining unit of the image processing apparatus, one or more pieces of image data to be processed;
detecting, with a motion detecting unit of the image processing apparatus, a motion of said image processing apparatus; and
controlling execution of a predetermined processing regarding said one or more pieces of image data determined via said determining based on detecting that a predetermined operation has been executed with respect to said image processing apparatus in said detecting,
wherein the predetermined processing includes executing an image search using at least one user-specified image as a search key, and
wherein said controlling execution includes graphically representing transmission of said one or more pieces of image data to another apparatus by depicting a decrease in a remaining number of said one or more pieces of image data to be transmitted along with a corresponding increase in a received number of said one or more pieces of image data that have been received.

19. The non-transitory computer-readable storage medium according to claim 18, wherein said processing control includes determining a face area of at least one person in a user-specified image and extracting image files including the at least one person, each of the extracted image files having a corresponding face area, area differences between the face area and the corresponding face areas each being specified by one of at least three predetermined ranges, each of which is associated with a corresponding predetermined degree of association.

* * * * *